(12) United States Patent
Koyama

(10) Patent No.: US 8,817,146 B2
(45) Date of Patent: Aug. 26, 2014

(54) IMAGING DEVICE INCLUDING LATCH CIRCUITS WITH SWITCHING DEVICES IN BETWEEN

(75) Inventor: Yusaku Koyama, Tokyo (JP)

(73) Assignee: Olympus Corporation, Tokyo (JP)

( * ) Notice: Subject to any disclaimer, the term of this patent is extended or adjusted under 35 U.S.C. 154(b) by 113 days.

(21) Appl. No.: 13/537,965

(22) Filed: Jun. 29, 2012

(65) Prior Publication Data
US 2013/0002914 A1 Jan. 3, 2013

(30) Foreign Application Priority Data

Jun. 30, 2011 (JP) ................. P2011-145110

(51) Int. Cl.
*H04N 5/335* (2011.01)
*H04N 5/378* (2011.01)

(52) U.S. Cl.
CPC ................... *H04N 5/378* (2013.01)
USPC ........................................................ 348/294

(58) Field of Classification Search
USPC ........................................................ 348/294
See application file for complete search history.

(56) References Cited

U.S. PATENT DOCUMENTS

| | | | | |
|---|---|---|---|---|
| 8,031,188 B2 * | 10/2011 | Nakajima et al. | ............. | 345/204 |
| 8,174,594 B2 * | 5/2012 | Koh | .............. | 348/294 |
| 8,208,055 B2 * | 6/2012 | Hiyama | ........................ | 348/300 |
| 8,520,796 B2 * | 8/2013 | Koyama | .......................... | 377/54 |
| 2003/0081134 A1 * | 5/2003 | Luo et al. | ....................... | 348/308 |
| 2004/0015758 A1 * | 1/2004 | Pathak et al. | .................. | 714/725 |
| 2007/0229687 A1 * | 10/2007 | Hiyama et al. | ................. | 348/294 |
| 2007/0268172 A1 * | 11/2007 | Watanabe | ....................... | 341/155 |
| 2009/0115876 A1 * | 5/2009 | Totsuka | ......................... | 348/294 |
| 2009/0244338 A1 * | 10/2009 | Kume | ........................... | 348/294 |
| 2009/0303361 A1 * | 12/2009 | Saito et al. | ..................... | 348/294 |
| 2011/0058078 A1 * | 3/2011 | Kume | ........................... | 348/294 |
| 2011/0068961 A1 * | 3/2011 | Hashimoto et al. | ............ | 341/118 |
| 2011/0090108 A1 * | 4/2011 | Hagihara et al. | .............. | 341/166 |
| 2011/0186713 A1 * | 8/2011 | Hagihara | ................... | 250/208.1 |
| 2012/0013493 A1 * | 1/2012 | Kato | ............................. | 341/120 |
| 2012/0112945 A1 * | 5/2012 | Hashimoto | ................... | 341/157 |
| 2012/0138772 A1 * | 6/2012 | Hagihara | ................... | 250/208.1 |
| 2013/0121455 A1 * | 5/2013 | Koyama | .......................... | 377/54 |

FOREIGN PATENT DOCUMENTS

JP 09-238286 A 9/1997

* cited by examiner

*Primary Examiner* — Nicholas Giles
*Assistant Examiner* — Abdelaaziz Tissire
(74) *Attorney, Agent, or Firm* — Westerman, Hattori, Daniels & Adrian, LLP

(57) ABSTRACT

An imaging device includes a pixel unit including a plurality of pixels, the pixels being arranged in a two-dimensional matrix form, m digital signal output circuits, each of which is arranged for a column of the pixel unit or for every two or more columns, and outputs an n-bit digital signal corresponding to a level of a pixel signal of a pixel of the corresponding column, m latch circuits, each of which is arranged to correspond to the digital signal output circuit, and includes n latch units that hold respective bit signals of the digital signal of the corresponding digital signal output circuit, respectively, and (m−1) switches, each of which is arranged to correspond to the latch unit, and transfers the digital signal held in the corresponding latch unit to the corresponding latch unit in the neighboring latch circuit.

9 Claims, 16 Drawing Sheets

PRIOR ART

IMAGING DEVICE INCLUDING LATCH CIRCUITS WITH SWITCHING DEVICES IN BETWEEN

BACKGROUND OF INVENTION

1. Field of the Invention

The present invention relates to an imaging device, and more particularly, to a solid-state imaging device including an analog-to-digital (AD) converting circuit for each column.

Priority is claimed on Japanese Patent Application No. 2011-145110, filed on Jun. 30, 2011, the content of which is incorporated herein by reference.

2. Description of Related Art

In recent years, solid-state imaging devices have been used in various devices such as still cameras, video cameras, medical endoscopic cameras, industrial endoscopic cameras, high-performance visual sensors for robots, and perimeter monitoring visual sensors for vehicles. Charged coupled device (CCD) image sensors and complementary metal-oxide semiconductor (CMOS) image sensors have been known as the solid-state imaging devices used in these devices.

A CMOS image sensor can be manufactured by the same technique as a general semiconductor manufacturing process, and thus the CMOS image sensor can have various functions by embedding various functional circuits in a sensor. For example, as an image sensor in which a functional circuit is embedded in a sensor, Japanese Unexamined Patent Application, First Publication No. H9-238286 discloses a technique related to an image sensor in which an AD converting circuit is provided for each column of a pixel array arranged in the form of a matrix, and a digital signal which has been subjected to AD conversion is output in units of rows.

In the image sensor in which an AD converting circuit is provided for each column, for example, a signal transfer circuit aiming for transfer of a signal is disposed between the AD converting circuit and a signal line through which a digital signal (signal information) is output to the outside. For example, the signal transfer circuit of this aim includes a latch circuit that temporarily latches or holds the digital signal output from the AD converting circuit and a switch for sequentially outputting the digital signal (signal information) to the outside of the image sensor.

FIG. 15 is a circuit connection diagram illustrating an example of a connection of components related to transfer of a digital signal in an image sensor of a related art. The signal transfer circuit illustrated in FIG. 15 temporarily holds digital signals output from a digital signal generating circuit, which outputs a digital signal (signal information), such as an AD converting circuit arranged for each column, and then sequentially outputs the digital signals (signal information) to the outside.

An AD converting circuit 111 is arranged in each of first to $m^{th}$ columns of a pixel array (not shown) and converts pixel analog signals output from pixels into an n-bit digital signal, and outputs respective bit signals to a latch circuit 211 through different lines. In the following description, a number in "( ): parentheses" following a symbol represents a bit of a digital signal. For example, a second bit of a digital signal is represented by "(2)."

Each latch circuit 211 holds respective bits of the n-bit digital signal output from the AD converting circuit 111 in internal latch units bits (1) to (n).

Signal transfer lines 311 are connected with the latch circuits 211 of respective columns via the switches SW(1) to SW(m). The respective bits of the signal transfer lines 311 correspond to the latch units bit(1) to bit(n) in the latch circuit 211 of each column, and the latch unit of the same bit in the latch circuit 211 of each column is connected to the signal transfer line 311 of the same bit.

In response to a control of the switches SW(1) to SW(m) from a driving control circuit (not shown), the digital signals held in the latch circuit 211 of each column are sequentially output to the outside of the sensor, a signal processing circuit in the sensor, or the like.

Here, transfer control of the digital signal (signal information) in the signal transfer circuit is described. FIG. 16 is a timing chart illustrating a driving timing when the digital signal is output from the signal transfer circuit in the image sensor of the related art. The timing chart illustrated in FIG. 16 illustrates a driving timing when the digital signals (signal information) held in the latch circuit 211 of the signal transfer circuit illustrated in FIG. 15 are sequentially output to the outside.

When the digital signals (signal information) held in the latch circuit 211 are output, in a data transfer time period, the switch SW(1) is first turned on, and thus the latch units bit(1) to bit(n) of the latch circuit 211 of a first column are connected to the signal transfer lines 311. Through this operation, the digital signals (signal information) held in the latch circuit 211 of the first column are output to the signal transfer lines 311. Thereafter, a switching operation to sequentially turn on the switches SW(2) to SW(m) is performed, and the digital signals (signal information) held in the corresponding latch circuits 211 are sequentially output to the signal transfer line 311.

SUMMARY OF THE INVENTION

According to a first aspect of the present invention, an imaging device includes a pixel unit including a plurality of pixels, each of which outputs a pixel signal corresponding to a quantity of incident light, the pixels being arranged in a two-dimensional matrix form, m digital signal output circuits (m is a natural number larger than 1), each of which is arranged for a column of the pixel unit or for every two or more columns, receives the pixel signal output from the pixel of the corresponding column, and outputs an n-bit digital signal (n is a natural number equal to or more than 1) corresponding to a level of the input pixel signal, m latch circuits, each of which is arranged to correspond to a digital signal output circuit, and includes n latch units that hold respective bit signals of the n-bit digital signal output from the corresponding digital signal output circuit, respectively, and (m−1) switches, each of which is arranged to correspond to a latch unit included in the latch circuit, and transfers the digital signal held in the corresponding latch unit to the corresponding latch unit in the neighboring latch circuit.

According to a second aspect of the present invention, the digital signal output circuit of the imaging device includes a plurality of delay units that delay an input pulse signal by a predetermined time to propagate the signal. The delay unit outputs a signal, which is based on the number of the delay units to which the pulse signal has propagated during a predetermined sampling time period with a delay time corresponding to the level of the input pixel signal, as the digital signal.

According to a third aspect of the present invention, the digital signal output circuit of the imaging device includes a delay circuit configured such that the plurality of delay units are connected in a ring form, and a counter circuit that counts a circling number of times that the pulse signal circles around the delay units. The digital signal output circuit outputs an output of each of the delay units configuring the delay circuit and the circling number counted by the counter circuit as the digital signal.

According to a fourth aspect of the present invention, the digital signal output circuit of the imaging device further includes a digital signal generating circuit that generates the digital signal based on the output of each of the delay units configuring the delay circuit and the circling number counted by the counter circuit.

According to a fifth aspect of the present invention, the digital signal output circuit of the imaging device further includes a comparison circuit that compares a magnitude relation of a voltage of the input pixel signal and a voltage of a reference ramp signal that changes from a minimum voltage of the pixel signal to a maximum voltage, and outputs a signal representing the magnitude relation, and a counter circuit that counts the number of reference clock signals until the signal representing the magnitude relation is inverted after the reference ramp signal is input. The digital signal output circuit outputs the number of reference clock signals counted by the counter circuit as the digital signal.

According to a sixth aspect of the present invention, the digital signal output circuit of the imaging device is an analog-digital (AD) converting circuit that converts the input pixel signal into the digital signal, and outputs the digital signal.

According to a seventh aspect of the present invention, each of the latch units included in the latch circuit of the imaging device holds a corresponding bit of the digital signal by a single feedback loop.

DETAILED DESCRIPTION OF THE INVENTION

First Embodiment

Figure 1:
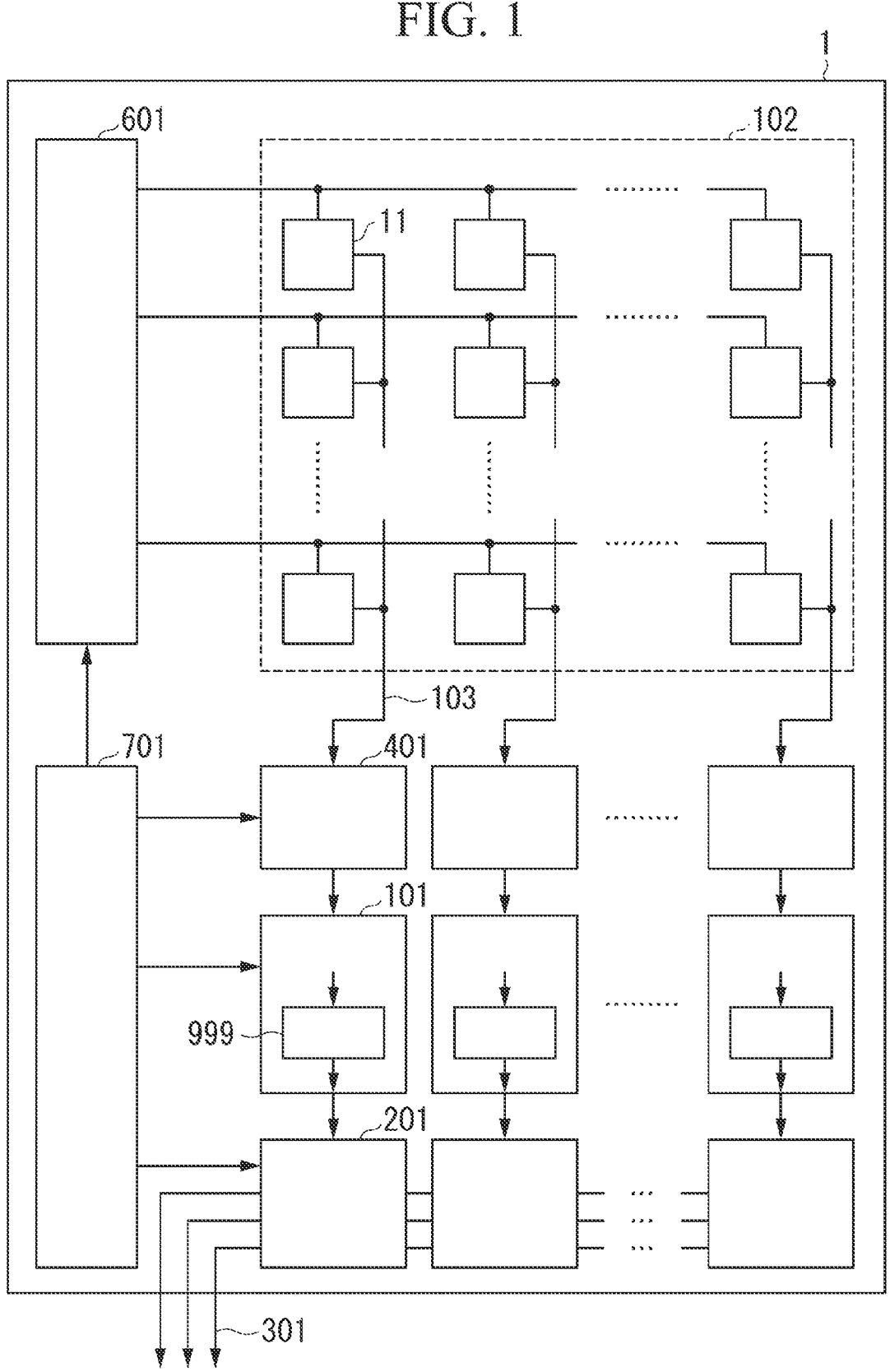
FIG. 1 is a block diagram illustrating a schematic configuration of an image sensor according to a first embodiment of the present invention.

Hereinafter, embodiments of the present invention will be described with reference to the accompanying drawings. FIG. 1 is a block diagram illustrating a schematic configuration of an image sensor according to a first embodiment of the present invention. As illustrated in FIG. 1, an image sensor 1 includes a pixel array 102, a plurality of vertical signal lines 103, a plurality of correlated double sampling (CDS) circuits 401, a plurality of AD converting circuits 101, a plurality of latch circuits 201, a plurality of horizontal signal lines 301, a vertical scanning circuit 601, and a timing generator 701.

The timing generator 701 outputs a driving control signal for driving each of the CDS circuit 401, the AD converting circuit 101, the latch circuit 201, and the vertical scanning circuit 601 according to a driving mode of the image sensor 1.

The vertical scanning circuit 601 outputs a pixel driving signal for driving unit pixels 11 arranged in the pixel array 102 in units of rows in response to the driving control signal input from the timing generator 701. The pixel driving signal output from the vertical scanning circuit 601 includes a row selecting signal for driving the unit pixels 11 in units of TOWS.

The pixel array 102 includes a plurality of unit pixels 11, each of which each includes a photoelectric conversion element, arranged in a two-dimensional array form in a row direction and a column direction. The unit pixel 11 converts received light signal information into an analog signal in response to the pixel driving signal input from the vertical scanning circuit 601, and outputs the converted analog signal to the vertical signal line 103 of each column of the pixel array 102 for each row of the pixel array 102. The unit pixels 11 are connected to the row selecting signal lines of the vertical scanning circuit 601 in units of rows and driven in units of rows in the pixel array 102 in response to the row selecting signal output from the vertical scanning circuit 601. In the following, the description will proceed in connection with an example in which the unit pixels 11 are arranged up to m columns.

The CDS circuit 401 is connected to the vertical signal line 103 of each column, and performs differential processing between a signal of a reset level generated when each unit pixel 11 is reset and a signal of a light level generated when light is incident in response to the driving control signal output from the timing generator 701. Then, The CDS circuit 401 outputs a pixel analog signal Vin which is a differentially processed signal to the AD converting circuit 101.

The AD converting circuit 101 is arranged to correspond to the CDS circuit 401 of each column, converts the pixel analog signal Vin input from the CDS circuit 401 into an n-bit digital signal in response to the driving control signal output from the timing generator 701, and outputs the n-bit digital signal to the corresponding latch circuit 201. The detailed description related to the AD converting circuit 101 will be described later.

The latch circuit 201 is arranged to correspond to the AD converting circuit 101 of each column, and serves as a signal transfer circuit that transfers the n-bit digital signal output from the AD converting circuit 101. The latch circuit 201 holds (latches) respective bits of the n-bit digital signal in an internal latch unit having a memory function when the AD conversion operation of the AD converting circuit 101 ends. Then, the latch circuit 201 outputs the n-bit digital signal held in the latch circuit 201 to the horizontal signal lines 301 of n bits through which the output signal of the image sensor 1 is output to the outside in response to the driving control signal output from the timing generator 701. A detailed description related to the latch circuit 201 will be provided later.

Figure 2:
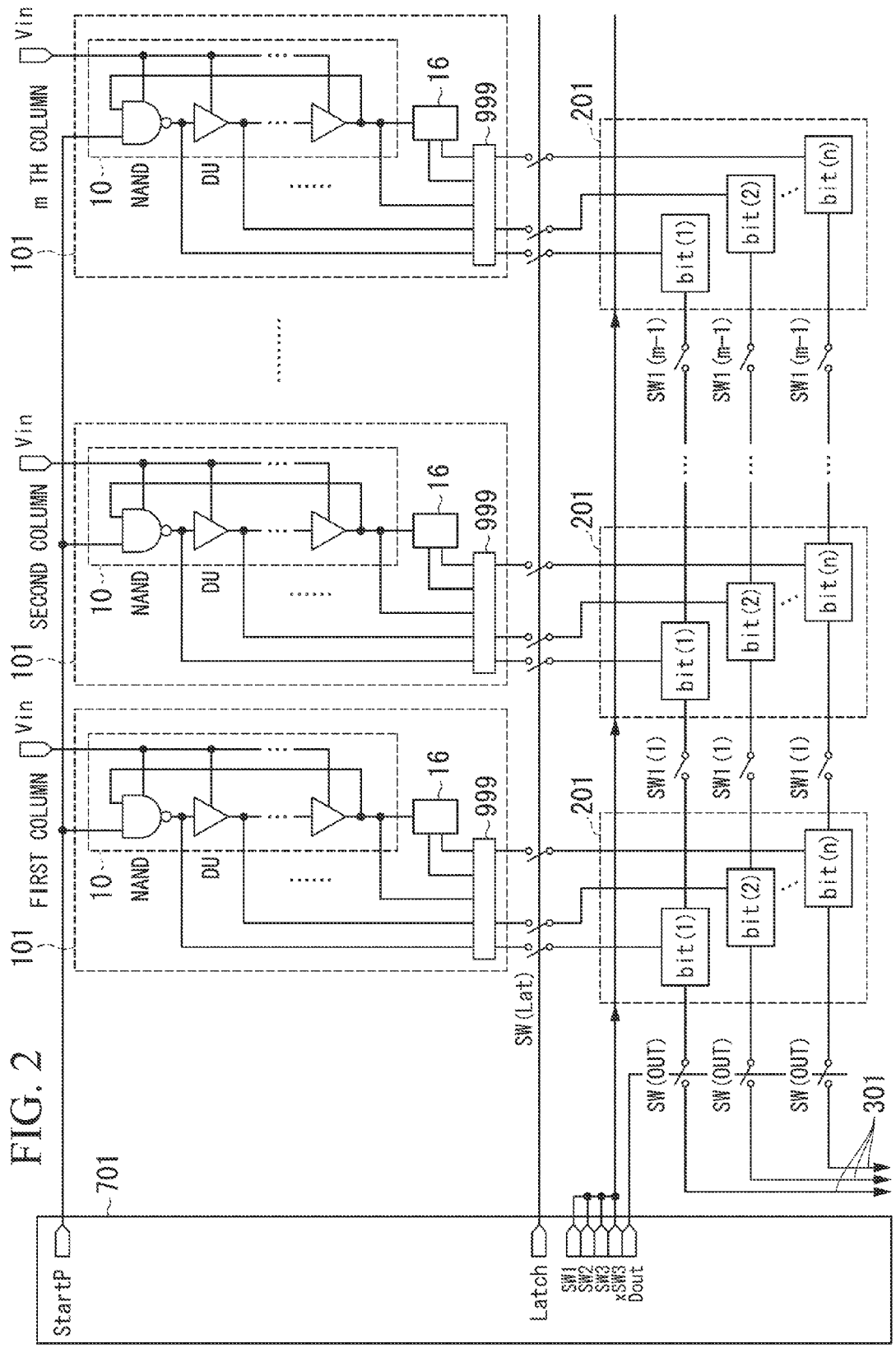
FIG. 2 is a circuit connection diagram illustrating an example of a connection of components related to transfer of a digital signal in the image sensor according to the first embodiment.

Next, in order to describe an output operation of the n-bit digital signal by the image sensor 1, a more detailed configuration of the image sensor 1 according to the first embodiment of the present invention will be described with reference to FIG. 2. FIG. 2 is a circuit connection diagram illustrating an example of a connection of components related to transfer of a digital signal in the image sensor 1 according to the first embodiment of the present invention. FIG. 2 illustrates a circuit configuration including the AD converting circuits 101 of first to $m^{th}$ columns of the pixel array 102, the latch circuits 201, and the horizontal signal lines 301 and a connection with the timing generator 701 in the image sensor 1 illustrated in FIG. 1.

The AD converting circuit 101 includes a pulse transit circuit 10, a counter 16, and an encoder 999. The pixel analog signal Vin output from the CDS circuit 401 is input to the AD converting circuit 101 as a voltage of an AD conversion target. The AD converting circuit 101 outputs the n-bit digital signal, which is obtained by performing AD conversion according to a voltage level of the pixel analog signal Vin input from the CDS circuit 401, to the latch circuit 201.

The pulse transit circuit 10 receives a pulse signal StartP output from the timing generator 701 through one input terminal thereof and receives an output of a buffer-type pulse delay circuit DU of a final stage of the pulse transit circuit 10 through the other input terminal thereof. In other words, the pulse transit circuit 10 is configured such that a NAND-type pulse delay circuit NAND used for activation is connected with a plurality of buffer-type pulse delay circuits DU in the form of a ring. The pixel analog signal Vin input from the CDS circuit 401 is supplied to each of the NAND-type pulse delay circuit NAND and a plurality of buffer-type pulse delay circuits DU as a power voltage. The pulse transit circuit 10 causes the pulse signal StartP, which is input to one input terminal of the NAND-type pulse delay circuit NAND, to circle during a delay time corresponding to a voltage value of a power voltage (the pixel analog signal Vin). In the following description, the NAND-type pulse delay circuit NAND and a plurality of buffer-type pulse delay circuits DU are referred to simply as a "pulse delay circuit" when they are not individually distinguished from each other.

The counter 16 counts a circling number of the pulse signal StartP that propagates along the pulse transit circuit 10 based on the output of the pulse delay circuit (the buffer-type pulse delay circuit DU) of the final stage of the pulse transit circuit 10.

The encoder 999 acquires (holds) an output of the pulse delay circuit (the NAND-type pulse delay circuit NAND and a plurality of buffer-type pulse delay circuits DU) in the pulse transit circuit 10 and an output of the counter 16. Here, the acquired output of the pulse delay circuit represents a transit position in the pulse transit circuit 10 when the pulse signal StartP is propagating along the pulse transit circuit 10. Then, the encoder 999 encodes the acquired output result (the transit position) of the pulse delay circuit in the pulse transit circuit 10. Thereafter, the encoder 999 outputs an n-bit digital signal in which an encoded result is used as a lower bit, and the acquired output result (the circling number) of the counter 16 is used as an upper bit. The n-bit digital signal is a signal obtained as a result of performing AD conversion on the pixel analog signal Vin through the AD converting circuit 101.

The latch circuit 201 includes latch units bit(1) to bit(n) that hold (latch) bit signals of the n-bit digital signal output from the AD converting circuit 101, respectively. The latch units bit(1) to bit(n) in the latch circuit 201 are connected with the encoder 999 in the AD converting circuit 101 via switches SW(Lat), and hold the respective bit signals of the n-bit digital signal output from the encoder 999 at an input timing of a clock signal Latch output from the timing generator 701. Further, a number in "( ): parentheses" following a symbol of a latch unit bit illustrated in FIG. 2 represents a bit of a corresponding digital signal. For example, a latch unit bit corresponding to a second bit of a digital signal is represented by "latch unit bit (2)." In the following description, the latch units bit(1) to bit(n) are referred to simply as a "latch unit bit" when they are not individually distinguished from one another.

The latch units bit in the latch circuit 201 corresponding to the AD converting circuit 101 of each column are connected with the latch units bit in the latch circuit 201 of a neighboring column via switches SW1(1) to SW1($m$−1), respectively. The latch circuit 201 of the first column is connected with the horizontal signal line 301 via a switch SW(OUT), and an output of the latch circuit 201 to the horizontal signal line 301 is controlled according to a clock signal Dout output from the timing generator 701.

The switches (switch SW(Lat), the switches SW1(1) to SW1($m$−1), and the switch SW(OUT)) illustrated in FIG. 2 are switches for signal line connecting that perform switching of connecting or disconnecting signal lines connected thereto, and perform switching between an ON (connection) state and an OFF (disconnection) state in response to the driving control signal output from the timing generator 701.

The timing generator 701 outputs the driving control signals, such as the pulse signal StartP, the clock signal Latch, and the clock signal Dout, to control all driving related to the AD conversion operation and the data transfer operation performed by the components illustrated in FIG. 2.

Next, the AD conversion operation of the AD converting circuit 101 will be described with reference to FIGS. 2 and 3.

Figure 3:
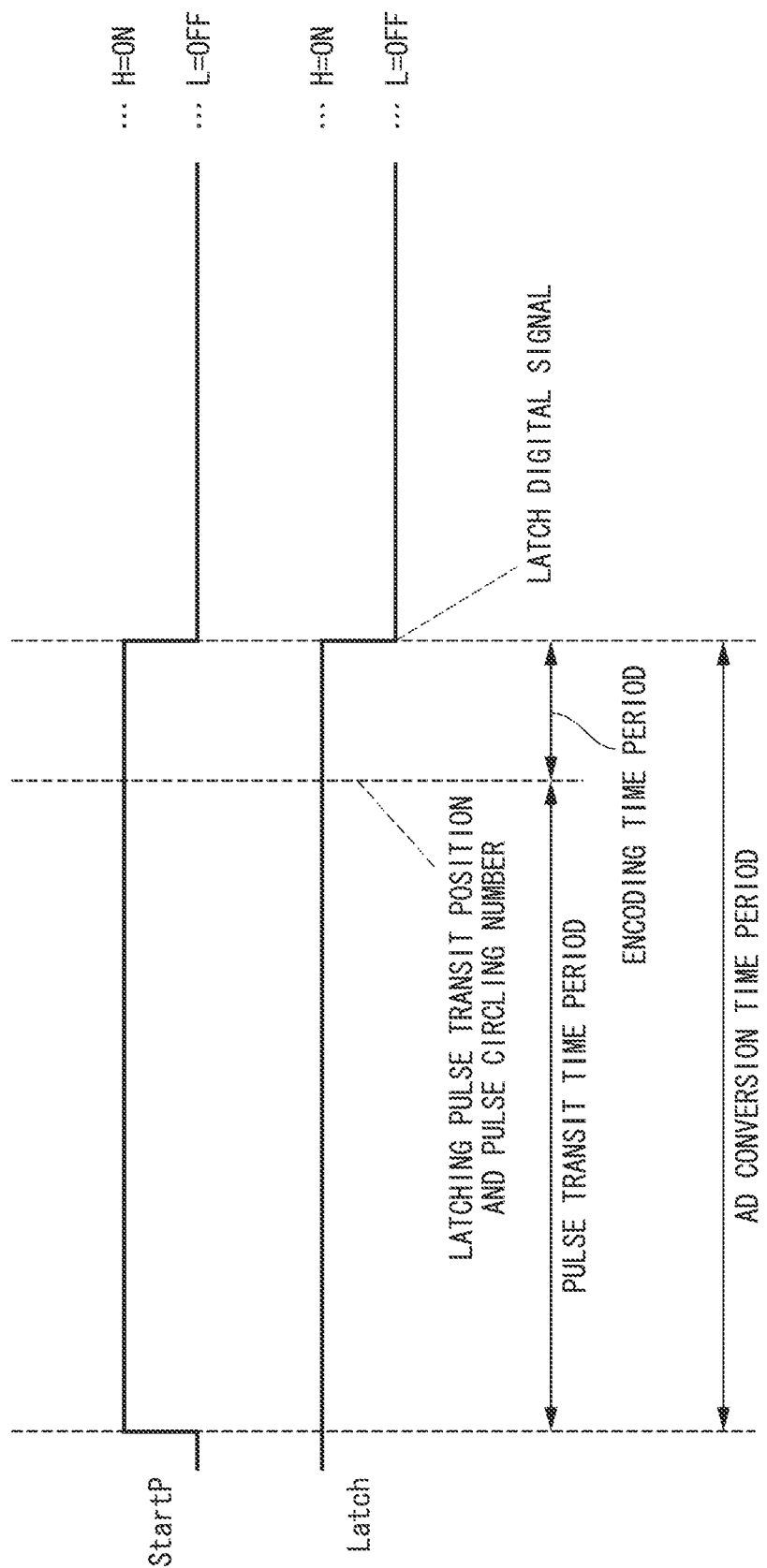
FIG. 3 is a timing chart illustrating an operation of an AD converting circuit included in the image sensor according to the first embodiment.

FIG. 3 is a timing chart illustrating an operation of the AD converting circuit 101 included in the image sensor 1 according to the first embodiment of the present invention.

First, when the pulse signal StartP transitions to an "H" level in a state in which the pixel analog signal Vin of the AD conversion target is supplied from the CDS circuit 401 as a power voltage of the pulse transit circuit 10, the AD converting circuit 101 starts AD conversion. During a pulse transit time period, an "H" level pulse of the pulse signal StartP circles around the pulse transit circuit 10 with a delay time corresponding to the voltage value of the pixel analog signal Vin.

Thereafter, when the pulse transit time period ends, the encoder 999 acquires the circling number of the pulse signal StartP counted by the counter 16 and the transit position of the pulse signal StartP in the pulse transit circuit 10 during an encoding time period. Thereafter, the encoder 999 outputs the n-bit digital signal which is based on the acquired transit position and the circling number of the pulse signal StartP.

Thereafter, at a timing that an AD conversion time period ends, the clock signal Latch transitions to an "L" level, and the switch SW(Lat) is turned off. At the same time, the latch circuit 201 holds the respective bit signals of the n-bit digital signal output from the AD converting circuit 101 in the latch units bit(1) to bit(n), respectively.

Thereafter, the latch circuit 201 outputs the held n-bit digital signal to the outside through the horizontal signal line 301 as the output signal of the image sensor 1 in response to the clock signal Dout output from the timing generator 701.

Figure 4:
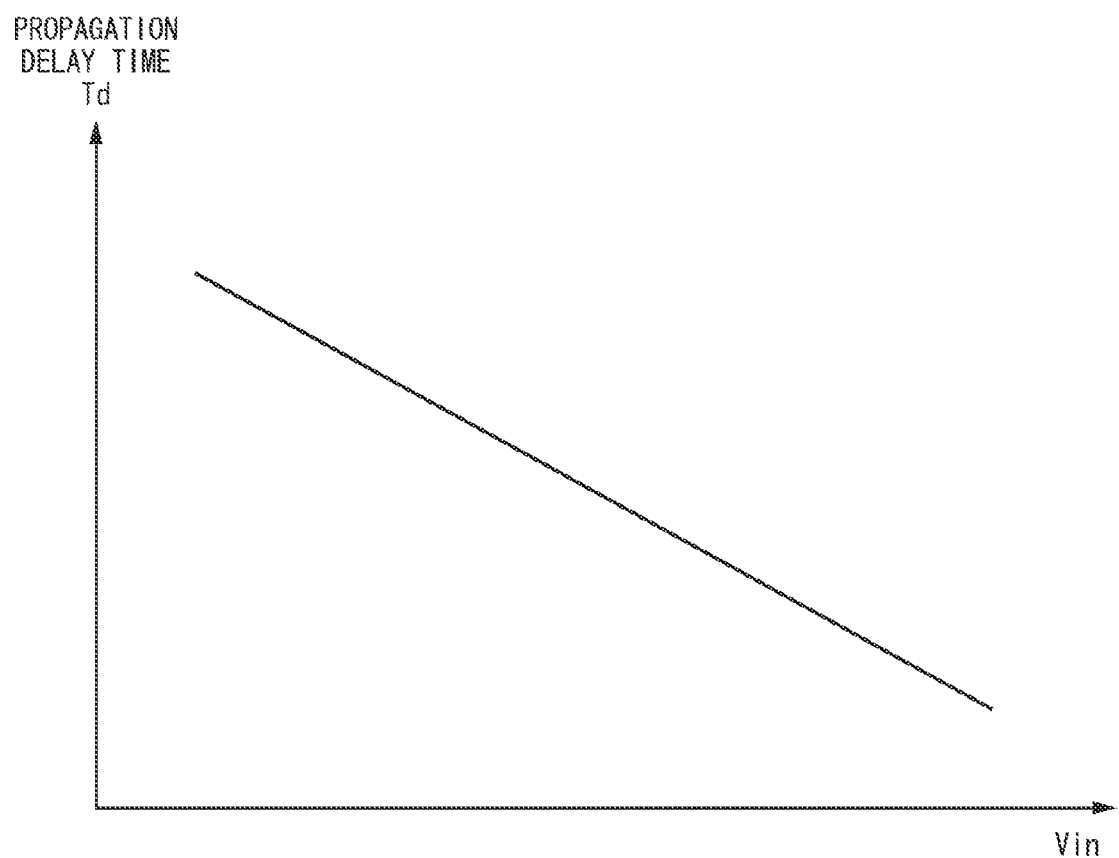
FIG. 4 is a graph illustrating a relation between an input voltage and a propagation delay time of a pulse propagating therein in the AD converting circuit included in the image sensor according to the first embodiment.

Here, a relation between the input voltage of the AD conversion target input to the AD converting circuit and the propagation delay time of the pulse signal that propagates along the AD converting circuit, that is, a relation between the analog signal input to the AD converting circuit and the digital signal output from the AD converting circuit, is described. FIG. 4 is a graph illustrating a relation between the input voltage of the AD converting circuit 101 and the propagation delay time of the pulse signal propagating inside the AD converting circuit 101 included in the image sensor 1 according to the first embodiment. Particularly, FIG. 4 illustrates a relation between the level of the pixel analog signal Vin which is the input voltage of the AD converting circuit 101 and the propagation delay time of the pulse signal StartP that propagates along the pulse transit circuit 10.

As illustrated in FIG. 4, in the AD converting circuit 101, when the voltage value of the pixel analog signal Vin is low, the propagation delay time Td of the pulse signal StartP in the pulse transit circuit 10 increases. Further, when the pixel analog signal Vin is high, the propagation delay time Td of the pulse signal StartP in the pulse transit circuit 10 decreases. In other words, the circling number of the pulse signal StartP that propagates the AD converting circuit 101 or an output of each the pulse delay circuit of the pulse transit circuit 10 changes depending on the level of the pixel analog signal Vin. The AD converting circuit 101 outputs the digital signal corresponding to the propagation delay time Td of the pulse signal StartP.

<First Latch Unit>

Figure 5:
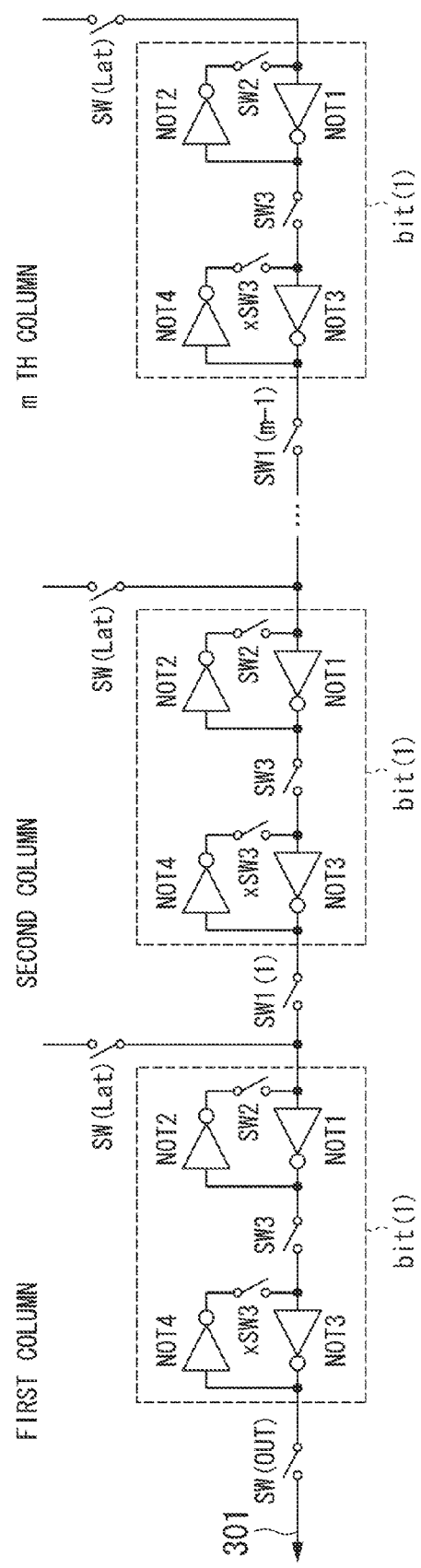
FIG. 5 is a circuit connection diagram illustrating an example of a detailed configuration of a first latch unit included in the image sensor according to the first embodiment.

Next, a configuration of the latch unit bit will be described. FIG. 5 is a circuit connection diagram illustrating an example of a detailed configuration of a first latch unit included in the image sensor 1 according to the first embodiment of the present invention. Particularly, FIG. 5 illustrates a configuration of a latch unit bit that holds a digital signal of 1 bit (a first bit: bit(1) in FIG. 5) output from the AD converting circuit 101 and a connection of the latch unit bit of each column among the configurations of the latch circuits 201 of first to $m^{th}$ columns arranged in the respective columns of the image sensor 1. In the following, the description will proceed in connection with a configuration in which 1-bit latch units bit of the latch circuits 201 of the first to $m^{th}$ columns illustrated in FIG. 5 are combined, that is, a configuration (hereinafter referred to as a "first latch circuit configuration") in which the m latch circuits 201 are combined.

The first latch circuit configuration illustrated in FIG. 5 includes m switches SW(Lat), each of which corresponds to a column, m first latch units bit(1), each of which corresponds to a column, the switches SW1(1) to SW1($m-1$), and the switch SW(OUT). The first latch circuit configurations corresponding to other bits of the n-bit digital signal have the same circuit configuration.

First, a configuration of the first latch unit bit will be described. The first latch unit bit includes a plurality of inverting circuits NOT1 to NOT4, a plurality of switches SW2 and SW3, and a switch xSW3. The inverting circuit NOT1 includes an input terminal connected to an output side terminal of the switch SW2 and an output terminal which is connected to an input terminal of the inverting circuit NOT2 and an input side terminal of the switch SW3. The inverting circuit NOT2 includes an input terminal connected to the output terminal of the inverting circuit NOT1 and an output terminal connected to an input side terminal of the switch SW2. The inverting circuit NOT3 includes an input terminal connected to output side terminals of the switch SW3 and the switch xSW3 and an output terminal connected to an input terminal of the inverting circuit NOT4. The inverting circuit NOT4 includes the input terminal connected to the output terminal of the inverting circuit NOT3 and an output terminal connected to the input side terminal of the switch xSW3.

Next, a connection of the first latch unit bit of each column will be described. In each of the first latch units bit used in the first to $m^{th}$ columns, the input terminal of the inverting circuit NOT1 is connected to the output side terminal of the switch SW(Lat), and so a signal of a corresponding bit of the digital signal output from the AD converting circuit 101 is input to the input terminal of the inverting circuit NOT1 via the switch SW(Lat). In the first latch units bit used in the second to $m^{th}$ columns, the output terminals of the inverting circuits NOT3 are connected to the input side terminals of the switches SW1(1) to SW1($m-1$), respectively. In the first latch units bit used in the first to $(m-1)^{th}$ columns, the input terminals of the inverting circuits NOT1 are connected to the output side terminals of the switches SW1(1) to SW1($m-1$), respectively, and the first latch units bit of the first to $m^{th}$ columns are serially connected to one another. In the first latch unit bit used in the first column, the output terminal of the inverting circuit NOT3 is connected to the input side terminal of the switch SW(OUT), and is connected with the horizontal signal line 301 via the switch SW(OUT).

As described above, in the first latch circuit configuration illustrated in FIG. 5, the first latch units bit of the first to $m^{th}$ columns are connected to one another in column number order, and the digital signal held in the first latch unit bit of the first column is output to the outside via the switch SW(OUT) and the horizontal signal line 301.

Figure 6:
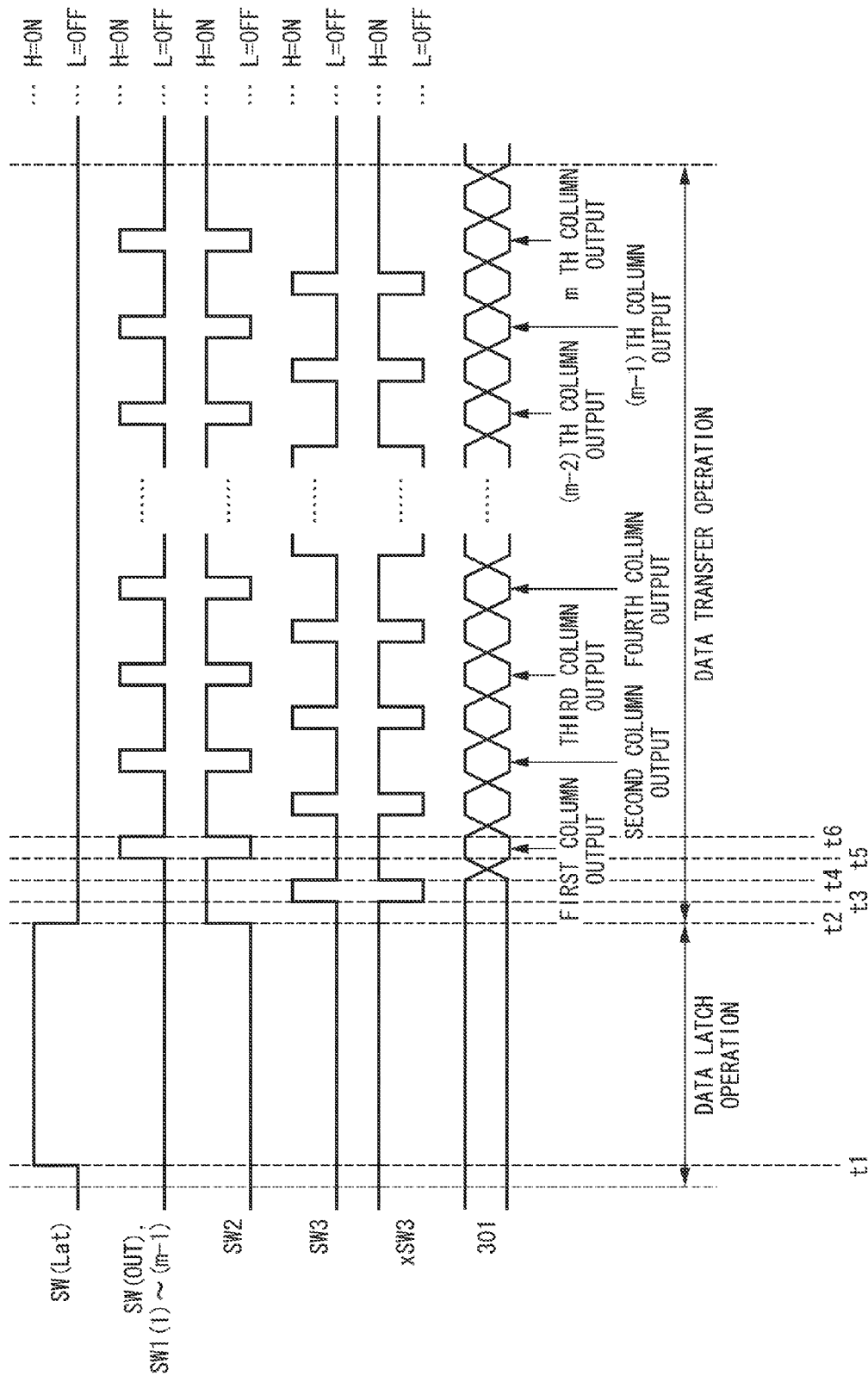
FIG. 6 is a timing chart illustrating a driving timing when the first latch unit transfers a digital signal.

Next, the digital signal transfer operation in the first latch circuit configuration will be described with reference to FIGS. 5 and 6. FIG. 6 is a timing chart illustrating a driving timing when the first latch unit transfers the digital signal. The timing chart illustrated in FIG. 6 illustrates a driving timing when a digital signal of 1 bit (a first bit: bit(1)) in the n-bit digital signal output from the AD converting circuit 101 is output to the outside through the horizontal signal line 301 as the output signal of the image sensor 1.

In the first latch circuit configuration, transfer control of the digital signal is performed such that the ON (connection) operation and the OFF (disconnection) operation of the switches (the switch SW(Lat), the switch SW(OUT), the switches SW1 to SW3, and the switch xSW3) are controlled according to the driving control signal input from the timing generator 701 (not shown). In the following, the description will proceed in connection with an example in which the switches of the first latch circuit configuration illustrated in FIG. 5 enter a connected (ON) state when the driving control signal output from the timing generator 701 is the "H" level, and enter a disconnected (OFF) state when the driving control signal is the "L" level. Further, the digital signal transfer operation is described based on the (ON or OFF) state of each switch, and the level of the driving control signal input from the timing generator 701 is described together therewith.

In the first latch circuit configuration, the AD conversion time period of the AD converting circuit 101 corresponds to a data latch operation time period of the latch circuit 201. At this time, in the first latch circuit configuration, the switch SW(OUT) and the switches SW1(1) to SW1(m−1) are in the OFF state (the clock signal Dout and the clock signals SW1(1) to SW1(m−1) are the "L" level). Further, in the switches of the first latch units bit of the respective columns, the switch SW2 is in the OFF state (the clock signal SW2 has the "L" level), the switch SW3 is in the OFF state (the clock signal SW3 is the "L" level), and the switch xSW3 is in the ON state (the clock signal xSW3 is the "H" level). In this state, until the AD conversion operation performed by the AD converting circuit 101 ends (the AD conversion time period illustrated in FIG. 3 ends), the switch SW(Lat) remains in the ON state (the clock signal Latch is the "H" level), and so the data latch operation of the digital signal is performed. Through this data latch operation, each digital signal output from the AD converting circuit 101 of each column is input to the input terminal of the inverting circuit NOT1 of the first latch unit bit(1) of each column (timing t1).

Then, the switch SW(Lat) enters the OFF state (the clock signal Latch transitions to the "L" level), and thus the data latch operation ends. At the same time, the switch SW2 enters the ON state (the clock signal SW2 transitions to the "H" level). As a result, a feedback loop configured with the inverting circuit NOT1 and the inverting circuit NOT2 is formed in the first latch unit bit(1) of each column, and so each digital signal output from the AD converting circuit 101 of each column is held in the feedback loop configured with the inverting circuit NOT1 and the inverting circuit NOT2 (timing t2).

Then, during the data transfer operation time period, as a first transfer operation, first the switch SW3 enters the ON state (the clock signal SW3 transitions to the "H" level), and the switch xSW3 enters the OFF state (the clock signal xSW3 transitions to the "L" level). As a result, an output of the inverting circuit NOT1 is input to the inverting circuit NOT3 (timing t3). Thereafter, the switch SW3 enters the OFF state (the clock signal SW3 transitions to the "L" level), and the switch xSW3 enters the ON state (the clock signal xSW3 transitions to the "H" level). As a result, a feedback loop configured with the inverting circuit NOT3 and the inverting circuit NOT4 is formed in the first latch unit bit(1) of each column, and so the digital signal held in the feedback loop configured with the inverting circuit NOT1 and the inverting circuit NOT2 is held in the feedback loop configured with the inverting circuit NOT3 and the inverting circuit NOT4 (timing t4).

Further, as a second transfer operation, the switch SW(OUT) and the switches SW1(1) to SW1(m−1) enter the ON state (the clock signal Dout and the clock signals SW1(1) to SW1(m−1) transition to the "H" level, and the switch SW2 enters the OFF state (the clock signal SW2 transitions to the "L" level). As a result, the output of the inverting circuit NOT3 is input (transferred) to the inverting circuit NOT1 of the first latch unit bit(1) of the neighboring column connected thereto. Further, the output of the inverting circuit NOT3 of the first latch unit bit(1) of the first column is output to the horizontal signal line 301 via the switch SW(OUT) (timing t5). Thereafter, the switch SW(OUT) and the switches SW1(1) to SW1(m−1) enter the OFF state (the clock signal Dout and the clock signals SW1(1) to SW1(m−1) transition to the "L" level), and the switch SW2 enters the ON state (the clock signal SW2 transitions to the "H" level). As a result, the transferred digital signal is held in the feedback loop configured with the inverting circuit NOT1 and the inverting circuit NOT2 in the first latch unit bit(1) of each column (timing t6).

Through the second transfer operation, for example, the digital signal held in the first latch unit bit(1) of the second column is transferred (moved) to the first latch unit bit(1) of the first column. The digital signal held in the first latch unit bit(1) of the third column is transferred (moved) to the first latch unit bit(1) of the second column. Further, the digital signal held in the first latch unit bit(1) of the $m^{th}$ column is transferred (moved) to the first latch unit bit(1) of the $(m-1)^{th}$ column. Further, the digital signal held in the first latch unit bit(1) of the first column is output to the outside from the horizontal signal line 301 through the switch SW(OUT).

Then, during the data transfer operation time period, the first transfer operation and the second transfer operation (operation of timings t3 to t6) are repeated until the digital signal held in the first latch unit bit(1) of the $m^{th}$ column is transferred (moved) to the first latch unit bit(1) of the first column, and then output to the outside from the horizontal signal line 301 through the switch SW(OUT).

Thus, the digital signal held in the first latch unit bit of each column is sequentially transferred (shifted) to the first latch unit bit of the neighboring column while being output to the outside from the horizontal signal line 301 through the switch SW(OUT). The digital signals of other bits output from the AD converting circuit 101 are also output to the outside from the horizontal signal line 301 by the same configuration and control.

As described above, according to the first latch circuit configuration, the digital signal (signal information) output from the AD converting circuit 101 can be reliably transferred. Further, in the first latch circuit configuration, since a connected circuit when the first latch unit bit of each column transfers the digital signal is only the first latch unit bit of the neighboring column, an interconnection length between the first latch units bit can be reduced, and thus parasitic resistance of a signal line between the first latch units bit can be reduced. Further, since a switch connected between the first latch units bit is only the switch SW(Lat) and either of the switch SW(OUT) and the switch SW1, parasitic capacitance of a signal line between the first latch units bit can be reduced. For this reason, a driving load when the digital signal is transferred in the first latch circuit configuration is much smaller than a latch circuit of the related art. As a result, in the first latch circuit configuration, the digital signal can be reliably transferred at a high speed, and the first latch unit bit can be configured with a smaller circuit size than the latch circuit of the related art. Furthermore, the first latch unit bit can be effectively configured with the small circuit size, for example, even when the first latch unit bit is arranged in a narrow area such as the column of the pixel array 102 as in the image sensor 1.

<Second Latch Unit>

Figure 7:
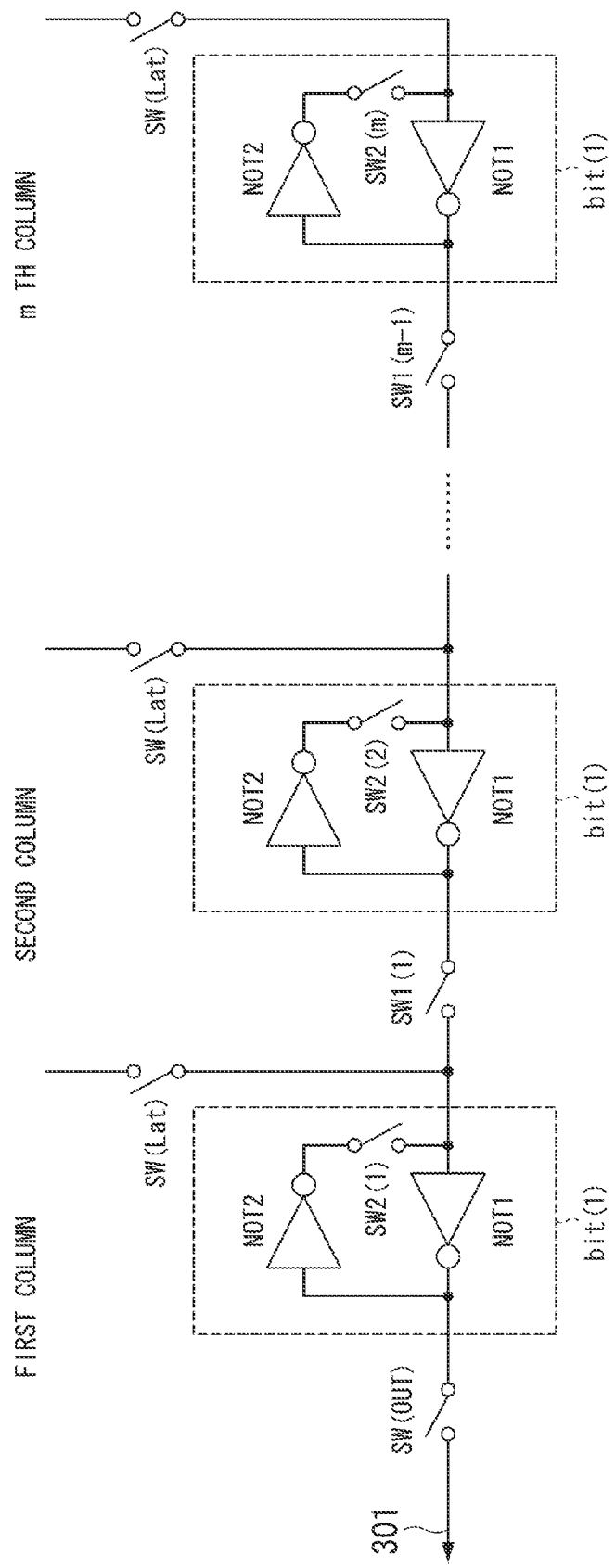
FIG. 7 is a circuit connection diagram illustrating an example of a detailed configuration of a second latch unit included in the image sensor according to the first embodiment.

Next, another configuration of a latch unit bit will be described. FIG. 7 is a circuit connection diagram illustrating an example of a detailed configuration of a second latch unit included in the image sensor 1 according to the first embodiment of the present invention. Similarly to the first latch circuit configuration illustrated in FIG. 5, FIG. 7 illustrates a configuration of a latch unit bit that holds a digital signal of 1 bit (a first bit: bit(1) in FIG. 7) output from the AD converting circuit 101 and a connection of the latch unit bit of each column among the configurations of the latch circuits 201 of first to m$^{th}$ columns arranged in the respective columns of the image sensor 1. In the following, the description will proceed in connection with a configuration in which 1-bit latch units bit of the latch circuits 201 of the first to m$^{th}$ columns illustrated in FIG. 7 are combined, that is, a configuration (hereinafter referred to as a "second latch circuit configuration") in which the m latch circuits 201 are combined.

The second latch circuit configuration illustrated in FIG. 7 includes m switches SW(Lat), each of which corresponds to a column, m second latch units bit(1), each of which corresponds to a column, the switches SW1(1) to SW1(m−1), and the switch SW(OUT). The second latch circuit configurations corresponding to other bits of the n-bit digital signal have the same circuit configuration. The second latch circuit configuration includes the second latch unit bit(1) instead of the first latch unit bit(1) of the first latch circuit configuration illustrated in FIG. 5.

First, a configuration of the second latch unit bit will be described. The second latch unit bit includes two inverting circuits NOT1 and NOT2 and a switch SW2. The inverting circuit NOT1 includes an input terminal connected to an output side terminal of the switch SW2 and an output terminal connected to an input terminal of the inverting circuit NOT2. The inverting circuit NOT2 includes the input terminal connected to the output terminal of the inverting circuit NOT1 and an output terminal connected to an input side terminal of the switch SW2.

Next, a connection of the second latch unit bit of each column will be described. In each of the second latch units bit used in the first to m$^{th}$ columns, the input terminal of the inverting circuit NOT1 is connected to the output side terminal of the switch SW(Lat), and so a signal of a corresponding bit of the digital signal output from the AD converting circuit 101 is input to the input terminal of the inverting circuit NOT1 via the switch SW(Lat). In the second latch units bit used in the second to m$^{th}$ columns, the output terminals of the inverting circuits NOT1 are connected to the input side terminals of the switches SW1(1) to SW1(m−1), respectively. In the second latch units bit used in the first to (m−1)$^{th}$ columns, the input terminals of the inverting circuits NOT1 are connected to the output side terminals of the switches SW1(1) to SW1(m−1), respectively, and the second latch units bit of the first to m$^{th}$ columns are serially connected to one another. In the second latch unit bit used in the first column, the output terminal of the inverting circuit NOT1 is connected to the input side terminal of the switch SW(OUT), and is connected with the horizontal signal line 301 via the switch SW(OUT).

As described above, in the second latch circuit configuration illustrated in FIG. 7, the second latch units bit of the first to m$^{th}$ columns are connected to one another in column number order, and the digital signal held in the second latch unit bit of the first column is output to the outside via the switch SW(OUT) and the horizontal signal line 301.

In the first latch circuit configuration illustrated in FIG. 5, the same switches in the first latch units bit used in all columns are simultaneously controlled by the timing generator 701. However, in the second latch circuit configuration, the switches SW2 in the second latch units bit used in the first to m$^{th}$ columns are controlled at different timings. Thus, in the second latch unit bit illustrated in FIG. 7, a number representing the number of a corresponding column is shown inside "( ): parentheses" following a symbol of the switch SW2. For example, "switch SW2(2)" represents the switch SW2 in the second latch unit used in the second column.

Figure 8:
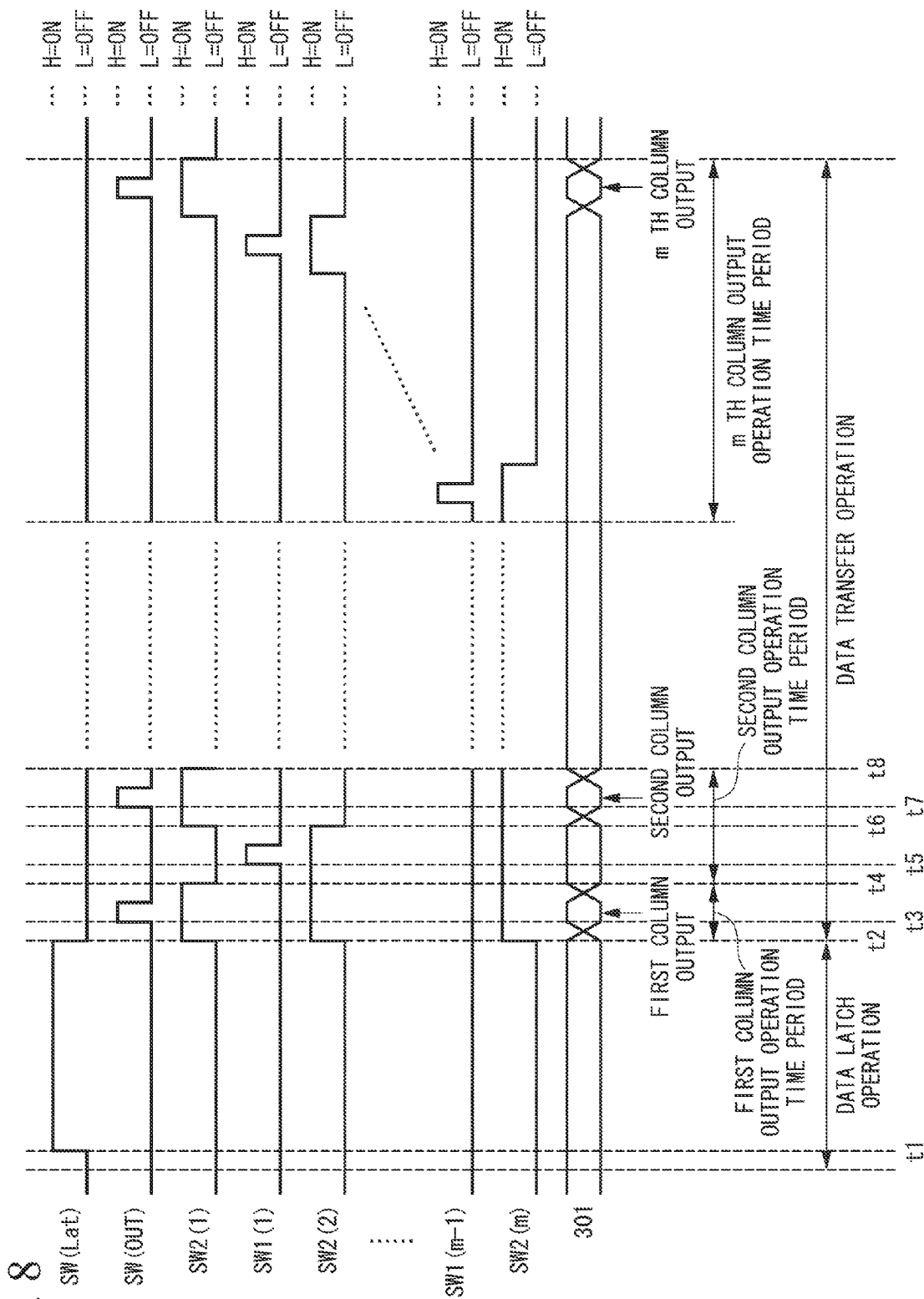
FIG. 8 is a timing chart illustrating a driving timing when a second latch unit transfers a digital signal.

Next, the digital signal transfer operation in the second latch circuit configuration will be described with reference to FIGS. 7 and 8. FIG. 8 is a timing chart illustrating a driving timing when the second latch unit transfers the digital signal. The timing chart illustrated in FIG. 8 illustrates a driving timing when a digital signal of 1 bit (a first bit: bit(1)) in the n-bit digital signal output from the AD converting circuit 101 is output to the outside through the horizontal signal line 301 as the output signal of the image sensor 1.

In the second latch circuit configuration, transfer control of the digital signal is performed such that the ON (connection) operation and the OFF (disconnection) operation of the switches (the switch SW(Lat), the switch SW(OUT), and the switches SW2(1) to SW2(m)) are controlled according to the driving control signal input from the timing generator 701 (not shown). In the following, the description will proceed in connection with an example in which the switches of the second latch circuit configuration illustrated in FIG. 7 enter a connected (ON) state when the driving control signal output from the timing generator 701 is the "H" level, and enter a disconnected (OFF) state when the driving control signal is the "H" level. Further, the digital signal transfer operation is described based on the (ON or OFF) state of each switch, and the level of the driving control signal input from the timing generator 701 is described together therewith.

In the second latch circuit configuration, the AD conversion time period of the AD converting circuit 101 corresponds to a data latch operation time period of the latch circuit 201. At this time, in the second latch circuit configuration, the switch SW(OUT) and the switches SW1(1) to SW1(m−1) are in the OFF state (the clock signal Dout and the clock signals SW1(1) to SW1(m−1) are the "L" level). Further, the switches SW2(1) to SW2(m) of the second latch units bit of the respective columns are in the OFF state (the clock signals SW2(1) to SW2(m) are the "L" level). In this state, until the AD conversion operation performed by the AD converting circuit 101 ends (the AD conversion time period illustrated in FIG. 3 ends), the switch SW(Lat) remains in the ON state (the clock signal Latch is the "H" level), and so the data latch operation of the digital signal is performed. Through this data latch operation, the digital signal output from the AD converting circuit 101 of each column is input to the input terminal of the inverting circuit NOT1 of the second latch unit bit(1) of the corresponding column (timing t1).

Then, the switch SW(Lat) enters the OFF state (the clock signal Latch transitions to the "L" level), and thus the data latch operation ends. At the same time, the switches SW2(1) to SW2(m) enter the ON state (the clock signals SW2(1) to SW2(m) transition to the "H" level). As a result, a feedback loop configured with the inverting circuit NOT1 and the inverting circuit NOT2 is formed in the second latch unit bit(1) of each column, and so the digital signal output from the AD converting circuit 101 of each column is held in the feedback loop configured with the inverting circuit NOT1 and the inverting circuit NOT2 (timing t2).

Then, during the data transfer operation time period, as the digital signal output operation of the first column, the switch SW(OUT) enters the ON state (the clock signal Dout transitions to the "H" level). As a result, the output of the inverting circuit NOT1 of the second latch unit bit(1) of the first column is output to the horizontal signal line 301 through the switch SW(OUT) (timing t3). Thereafter, the switch SW(OUT) enters the OFF state (the clock signal Dout transitions to the "L" level), and then the switch SW2(1) enters the OFF state (the clock signal SW2(1) transitions to the "L" level). Thus, the feedback loop configured with the inverting circuit NOT1 and the inverting circuit NOT2 in the second latch unit bit(1) of the first column is released, and the held digital signal is discarded (timing t4).

Subsequently, as the digital signal output operation of the second column, the switch SW1(1) enters the ON state (the clock signal SW1(1) transitions to the "H" level). As a result, the output of the inverting circuit NOT1 of the second latch unit bit(1) of the second column is input (transferred) to the inverting circuit NOT1 of the connected second latch unit bit(1) of the first column (timing t5). Thereafter, the switch SW1(1) enters the OFF state (the clock signal SW1(1) transitions to the "L" level), and then the switch SW2(1) enters the ON state (the clock signal SW2(1) transitions to the "H" level).

As a result, the transferred digital signal of the second column is held in the feedback loop configured with the inverting circuit NOT1 and the inverting circuit NOT2 in the second latch unit bit(1) of the first column. At the same time, the switch SW2(2) enters the OFF state (the clock signal SW2(2) transitions to the "L" level). Thus, the feedback loop configured with the inverting circuit NOT1 and the inverting circuit NOT2 in the second latch unit bit(1) of the second column is released, and the held digital signal is discarded (timing t6).

Thereafter, the switch SW(OUT) enters the ON state (the clock signal Dout transitions to the "H" level). As a result, the output of the inverting circuit NOT1 of the second latch unit bit(1) of the first column, that is, the transferred digital signal of the second column, is output to the horizontal signal line 301 through the switch SW(OUT) (timing t7). Thereafter, the switch SW(OUT) enters the OFF state (the clock signal Dout transitions to the "L" level), and then the switch SW2(1) enters the OFF state (the clock signal SW2(1) transitions to the "L" level). Thus, the feedback loop configured with the inverting circuit NOT1 and the inverting circuit NOT2 in the second latch unit bit(1) of the first column is released, and the held digital signal of the second column is discarded (timing t8).

Then, during the data transfer operation time period, similarly to the digital signal output operation of the second column, the digital signal output operation of the third column to the digital signal output operation of the $m^{th}$ column are sequentially performed. This output operation is repeated until the digital signal held in the second latch unit bit(1) of the $m^{th}$ column is transferred (moved) to the second latch unit bit(1) of the first column, and then output to the outside from the horizontal signal line 301 through the switch SW(OUT).

Thus, the digital signal held in the second latch unit bit of each column is sequentially transferred column by column to the second latch unit bit of the preceding column while being output to the outside from the horizontal signal line 30 through the switch SW(OUT). The digital signals of other bits output from the AD converting circuit 101 are also output to the outside from the horizontal signal line 301 by the same configuration and control.

As described above, according to the second latch circuit configuration, the digital signal (signal information) output from the AD converting circuit 101 can be reliably transferred column by column. Further, in the second latch circuit configuration, the second latch unit bit of each column can be configured with the two inverting circuits NOT1 and NOT2 and the switch SW2. Thus, in the second latch circuit configuration, the second latch unit bit can be configured with a much smaller circuit size than the first latch unit bit of the first latch circuit configuration illustrated in FIG. 5. Further, even in the second latch circuit configuration, similarly to the first latch circuit configuration illustrated in FIG. 5, a connected circuit when the second latch unit bit of each column transfers the digital signal is only the second latch unit bit of the neighboring column. Thus, an interconnection length between the second latch units bit can be reduced, and thus parasitic resistance and parasitic capacitance of a signal line can be reduced. Further, the second latch unit bit has fewer switches than the first latch unit bit illustrated in FIG. 5, and thus parasitic capacitance can be further reduced. For this reason, a driving load required to transfer the digital signal in the second latch circuit configuration is much smaller than in the first latch circuit configuration illustrated in FIG. 5. As a result, in the second latch circuit configuration, the digital signal can be reliably transferred, and the second latch unit bit can be arranged in a narrow area more effectively than in the first latch circuit configuration illustrated in FIG. 5.

Figure 9:
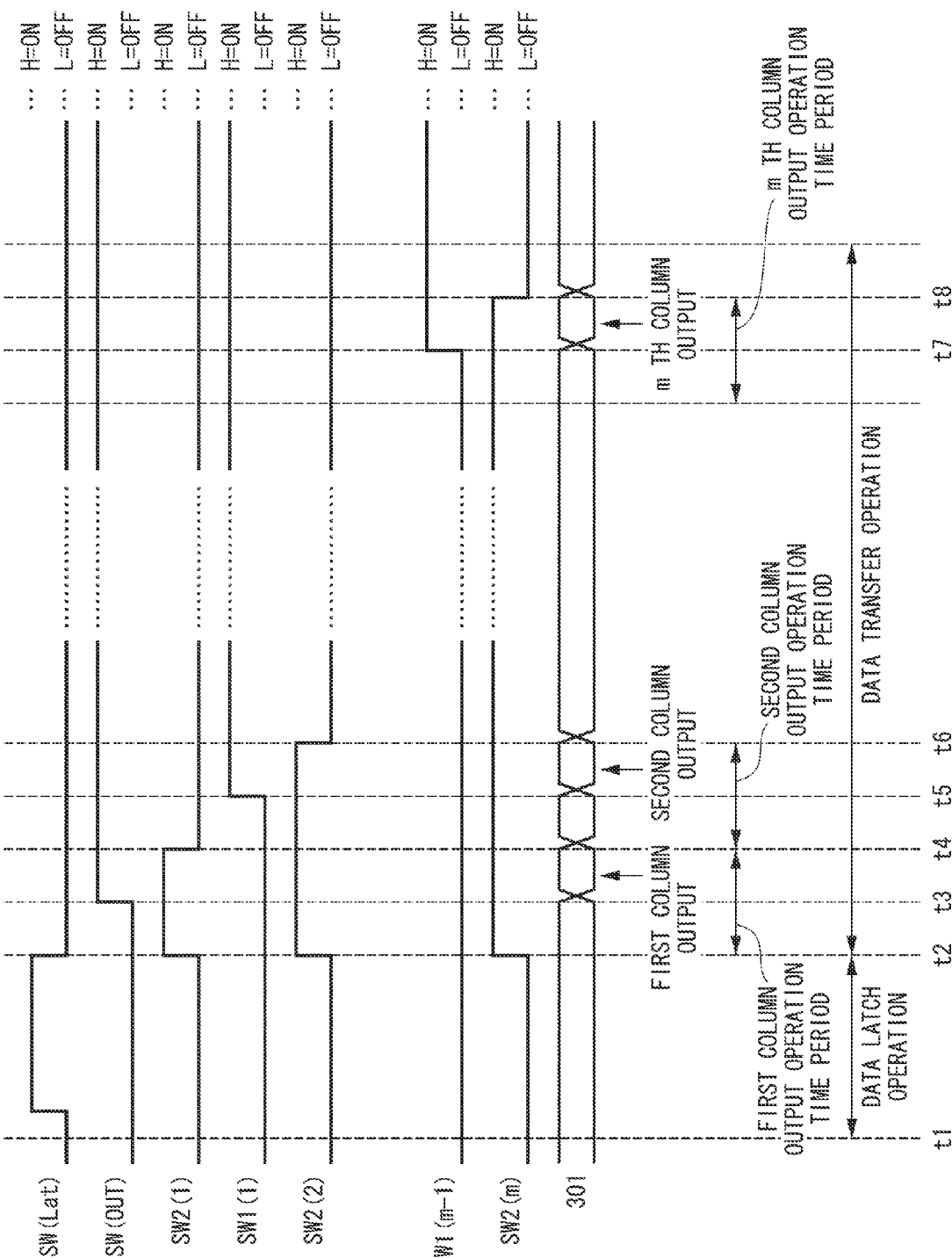
FIG. 9 is a timing chart illustrating another driving timing when the second latch unit transfers a digital signal.

Next, another transfer operation of the digital signal in the second latch circuit configuration will be described with reference to FIGS. 7 and 9. FIG. 9 is a timing chart illustrating another driving timing (second transfer control) when the second latch unit transfers the digital signal. Similarly to the timing chart illustrated in FIG. 8, the timing chart illustrated in FIG. 9 illustrates a driving timing when a digital signal of 1 bit (a first bit: bit(1)) in the n-bit digital signal output from the AD converting circuit 101 is output to the outside through the horizontal signal line 301 as the output signal of the image sensor 1.

In the second latch circuit configuration illustrated in FIG. 9, the second transfer control of the digital signal is performed such that the ON (connection) operation and the OFF (disconnection) operation of the switches (the switch SW(Lat), the switch SW(OUT), and the switch SW2) are controlled according to the driving control signal input from the timing generator 701 (not shown). In the following, the description will proceed in connection with an example in which the switches of the second latch circuit configuration illustrated in FIG. 7 enter a connected (ON) state when the driving control signal output from the timing generator 701 is the "H" level, and enter a disconnected (OFF) state when the driving control signal is the "L" level. Further, the digital signal transfer operation is described based on the (ON or OFF) state of each switch, and the level of the driving control signal input from the timing generator 701 is described together therewith.

In the second latch circuit configuration, the AD conversion time period of the AD converting circuit 101 corresponds to a data latch operation time period of the latch circuit 201. At this time, in the second latch circuit configuration, the switch SW(OUT) and the switches SW1(1) to SW1($m$−1) are in the OFF state (the clock signal Dout and the clock signals SW1 (1) to SW1($m$−1) are the "L" level), and the switch SW2(1) to SW2($m$) are in the OFF state (the clock signals SW2(1) to SW2($m$) are the "L" level). In this state, until the AD conversion operation performed by the AD converting circuit 101 ends (the AD conversion time period illustrated in FIG. 3 ends), the switch SW(Lat) remains in the ON state (the clock signal Latch is the "H" level), and so the data latch operation of the digital signal is performed. Through this data latch operation, each digital signal output from the AD converting circuit 101 of each column is input to the input terminal of the inverting circuit NOT1 of the second latch unit bit(1) of each column (timing t1).

Then, the switch SW(Lat) enters the OFF state (the clock signal Latch transitions to the "L" level), and thus the data latch operation ends. At the same time, the switches SW2(1) to SW2($m$) enter the ON state (the clock signals SW2(1) to SW2($m$) transition to the "H" level). As a result, a feedback loop configured with the inverting circuit NOT1 and the inverting circuit NOT2 is formed in the second latch unit bit(1) of each column, and so the digital signal output from the AD converting circuit 101 of each column is held in the feedback loop configured with the inverting circuit NOT1 and the inverting circuit NOT2 (timing t2).

Then, during the data transfer operation time period, as the digital signal output operation of the first column, the switch SW(OUT) enters the ON state (the clock signal Dout transitions to the "H" level). As a result, the output of the inverting circuit NOT1 of the second latch unit bit(1) of the first column is output to the horizontal signal line 301 through the switch SW(OUT) (timing t3). Thereafter, the switch SW2(1) enters the OFF state (the clock signal SW2(1) transitions to the "L" level). Thus, the feedback loop configured with the inverting circuit NOT1 and the inverting circuit NOT2 in the second latch unit bit(1) of the first column is released, and the held digital signal is discarded (timing t4).

Subsequently, as the digital signal output operation of the second column, the switch SW1(1) enters the ON state (the clock signal SW1(1) transitions to the "H" level). At this time, the switch SW(OUT) remains in the ON state. As a result, the output of the inverting circuit NOT1 of the second latch unit bit(1) of the second column passes through the inverting circuit NOT1 of the connected second latch unit bit(1) of the first column, and then is output to the horizontal signal line 301 through the switch SW(OUT) (timing t5). Thereafter, the switch SW2(2) enters the OFF state (the clock signal SW2(2) transitions to the "L" level). Thus, the feedback loop configured with the inverting circuit NOT1 and the inverting circuit NOT2 in the second latch unit bit(1) of the second column is released, and the held digital signal is discarded (timing t6).

Then, during the data transfer operation time period, similarly to the digital signal output operation of the second column, the digital signal output operation of the third column to the digital signal output operation of the $(m-1)^{th}$ column are sequentially performed and repeated until the digital signal held in the second latch unit bit(1) of the $(m-1)^{th}$ column passes through the second latch units bit of the $(m-2)^{th}$ to first columns in sequence and then is output to the outside from the horizontal signal line 301 through the switch SW(OUT).

Finally, the digital signal output operation of the $m^{th}$ column starts. At this time, all of the switch SW(OUT) and the switches SW1(1) to SW1($m-2$) remain in the ON state. Further, all of the switches SW2(1) to SW2($m-1$) remain in the OFF state. Then, in the digital signal output operation of the $m^{th}$ column, in this state, the switch SW1($m-1$) enters the ON state (the clock signal SW1($m-1$) transitions to the "H" level). Through this operation, the output of the inverting circuit NOT1 of the second latch unit bit(1) of the $m^{th}$ column passes through the inverting circuits NOT1 of the connected second latch units bit(1) of the first to $(m-1)^{th}$ columns in sequence, and then is output to the horizontal signal line 301 through the switch SW(OUT) (timing t7). Thereafter, the switch SW2($m$) enters the OFF state (the clock signal SW2($m$) transitions to the "L" level), the feedback loop configured with the inverting circuit NOT1 and the inverting circuit NOT2 in the second latch unit bit(1) of the $m^{th}$ column is released, and the held digital signal is discarded (timing t8).

Thus, the digital signal held in the second latch unit bit of each column passes through the inverting circuit NOT1 of the second latch unit bit of the preceding column in sequence column by column, and then is output to the outside from the horizontal signal line 301 through the switch SW(OUT). The digital signals of other bits output from the AD converting circuit 101 are also output to the outside from the horizontal signal line 301 by the same configuration and control.

As described above, even in the second transfer control of the second latch circuit configuration, the digital signal (signal information) output from the AD converting circuit 101 can be reliably transferred column by column.

Further, even in the second transfer control of the second latch circuit configuration, the inverting circuit NOT1 of the second latch unit bit of each column is used in the same manner as an interconnection buffer, and thus the digital signal can be transferred faster than in the transfer control of the second latch circuit configuration illustrated in FIG. 8.

As described above, according to the image sensor 1 of the first embodiment of the present invention, the latch circuit 201 can be configured with the small circuit size, and a driving load required for the latch circuit 201 to transfer the digital signal can be reduced. Further, the latch circuit 201 can reliably transfer the digital signal (signal information) output from the AD converting circuit 101.

Second Embodiment

Figure 10:
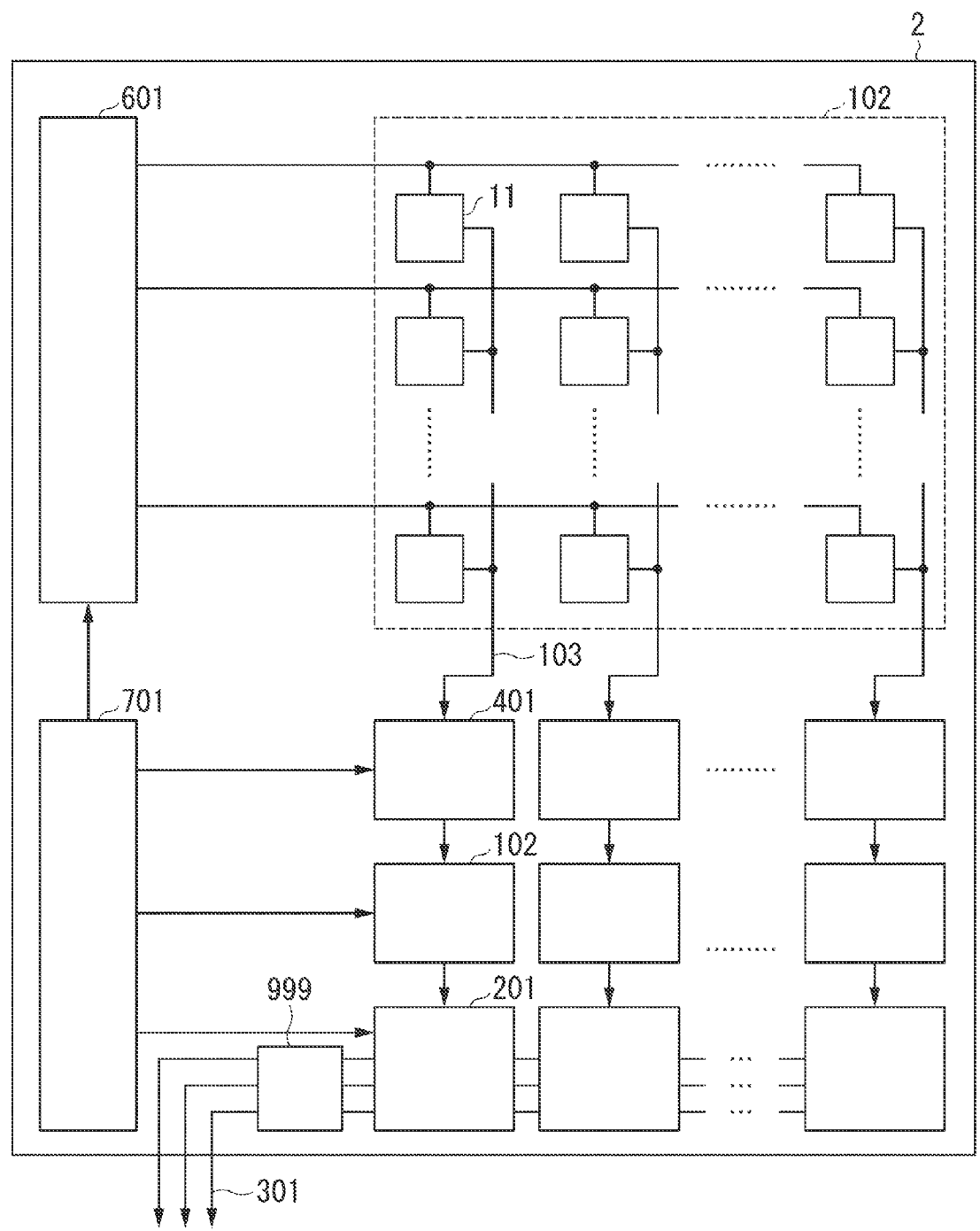
FIG. 10 is a block diagram illustrating a schematic configuration of an image sensor according to a second embodiment of the present invention.

Next, an image sensor according to a second embodiment of the present invention will be described. FIG. 10 is a block diagram illustrating a schematic configuration of an image sensor according to the second embodiment of the present invention. As illustrated in FIG. 10, an image sensor 2 includes a pixel array 102, a plurality of vertical signal lines 103, a plurality of CDS circuits 401, a plurality of AD converting circuits 101, a plurality of latch circuits 201, a plurality of horizontal signal lines 301, a vertical scanning circuit 601, a timing generator 701, and an encoder 999.

The image sensor 2 according to the second embodiment of the present invention is different from the image sensor 1 according to the first embodiment illustrated in FIG. 1 in that the AD converting circuit 102 is provided instead of the AD converting circuit 101, and the encoder 999 which has been included in each of the AD converting circuits 101 is shared by the AD converting circuits 102 of all columns. Further, in the image sensor 2 according to the second embodiment of the present invention, the latch circuit 201 receives the digital signal output from the AD converting circuit 102 instead of the AD converting circuit 101, and the remaining configuration is the same as the image sensor 1 of the first embodiment illustrated in FIG. 1. Thus, the same components as in the image sensor 1 according to the first embodiment illustrated in FIG. 1 are denoted by the same reference numerals, and a detailed description thereof will not be included here.

The AD converting circuit 102 is arranged to correspond to the CDS circuit 401 of each column, and outputs the digital signal (the pulse circling number and the pulse transit position) corresponding to the pixel analog signal Vin input from the CDS circuit 401 to the corresponding latch circuit 201 in response to the driving control signal output from the timing generator 701. The detailed description related to the AD converting circuit 102 will be described later.

The latch circuit 201 is arranged to correspond to the AD converting circuit 102 of each column, and serves as a signal transfer circuit that transfers the digital signal output from the AD converting circuit 102 to the encoder 999. The latch circuit 201 holds (latches) respective bits of the n-bit digital signal corresponding to the voltage value of the pixel analog signal Vin output from the AD converting circuit 102 in an internal latch unit having a memory function when the pulse transit time period (see FIG. 3) of the AD converting circuit 102 ends. The n-bit digital signal held in the latch circuit 201 is output to the encoder 999 in response to the driving control signal output from the timing generator 701.

Figure 11:
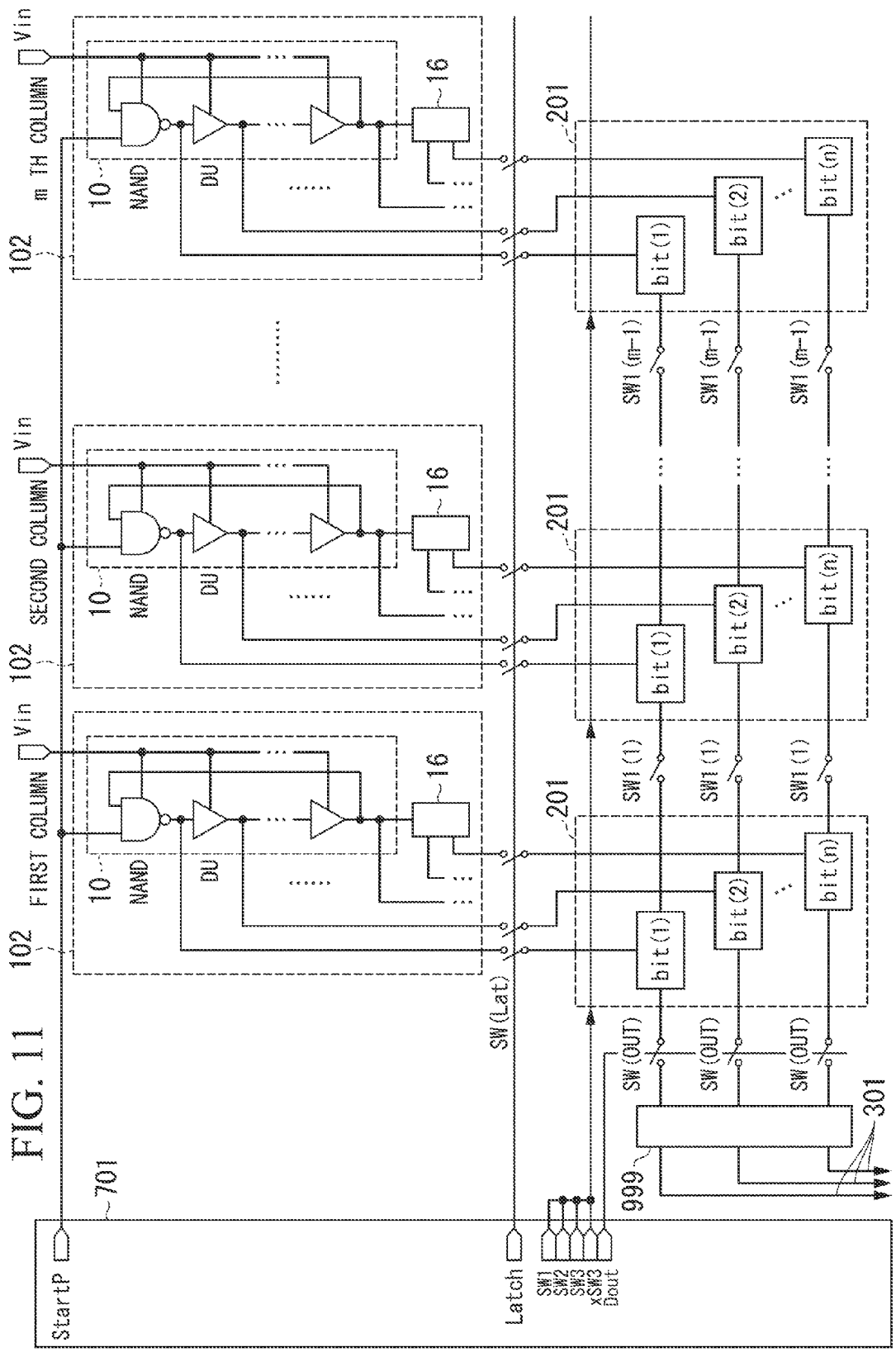
FIG. 11 is a circuit connection diagram illustrating an example of a connection of components related to transfer of a digital signal in the image sensor according to the second embodiment.

Next, in order to describe the digital signal output operation by the image sensor 2, a more detailed configuration of the image sensor 2 according to the second embodiment of the present invention will be described with reference to FIG. 11. FIG. 11 is a circuit connection diagram illustrating an example of a connection of components related to transfer of a digital signal in the image sensor 2 according to the second embodiment of the present invention. FIG. 11 illustrates a circuit configuration including the AD converting circuits 102 of first to $m^{th}$ columns of the pixel array 102, the latch circuits 201, the encoder 999, and the horizontal signal lines 301 and a connection with the timing generator 701 in the image sensor 2 illustrated in FIG. 10.

The AD converting circuit 102 includes a pulse transit circuit 10 and a counter 16.

The pixel analog signal Vin output from the CDS circuit 401 is input to the AD converting circuit 102 as a voltage of an AD conversion target. The AD converting circuit 102 outputs the n-bit digital signal, which corresponds to the voltage level of the pixel analog signal Vin input from the CDS circuit 401, to the latch circuit 201. The pulse transit circuit 10 and the counter 16 in the AD converting circuit 102 have the same configuration as the pulse transit circuit 10 and the counter 16 in the AD converting circuit 101 illustrated in FIG. 2. Thus, the same reference numerals are assigned, and the description will not be repeated here.

The latch circuit 201 has the same configuration as the latch circuit 201 described in the first embodiment.

The latch circuit 201 holds the digital signal including the transit position of the pulse signal StartP output from the pulse transit circuit 10 of the AD converting circuit 102 and the circling number of the pulse signal StartP output from the counter 16 in latch units bit(1) to bit(n) in units of bits at an input timing of a clock signal Latch output from the timing generator 701. Further, a number in "( ): parentheses" following a symbol of a latch unit bit illustrated in FIG. 11 represents a bit of a corresponding digital signal.

The latch units bit in the latch circuit 201 corresponding to the AD converting circuit 102 of each column are connected with the latch units bit in the latch circuit 201 of a neighboring column via switches SW1(1) to SW1($m$−1), respectively, similarly to the latch circuit 201 according to the first embodiment. The latch circuit 201 of the first column is connected with the encoder 999 via a switch SW(OUT), and an output of the held digital signal to the encoder 999 is controlled according to a clock signal Dout output from the timing generator 701.

The encoder 999 is arranged to be shared by the AD converting circuits 102 and the latch circuits 201 of the respective columns, and outputs a result of encoding the digital signal including the transit position and the circling number of the pulse signal StartP output from the latch circuit 201 to the outside through the horizontal signal line 301 as the output signal of the image sensor 2. The encoding process performed by the encoder 999 is the same as that of the encoder 999 included in the AD converting circuit 101 described in the first embodiment. In other words, the encoder 999 outputs an n-bit digital signal in which a result of encoding the transit position output from the latch circuit 201 is used as a lower bit, and the circling number output from the latch circuit 201 is used as an upper bit.

In the image sensor 2 according to the second embodiment of the present invention, a configuration in which the AD converting circuit 102, the latch circuit 201, and the encoder 999 are combined corresponds to the AD converting circuit 101 included in the image sensor 1 according to the first embodiment.

The switches (the switch SW(Lat), the switches SW1(1) to SW1($m$−1), and the switch SW(OUT)) illustrated in FIG. 11 are signal line connecting switches that perform switching of connecting or disconnecting signal lines connected thereto, and perform switching between an ON (connection) state and an OFF (disconnection) state in response to the driving control signal output from the timing generator 701, similarly to the image sensor 1 according to the first embodiment illustrated in FIG. 2.

The timing generator 701 outputs the driving control signals, such as the pulse signal StartP, the clock signal Latch, and the clock signal Dout, to control all driving related to the AD conversion operation and the data transfer operation performed by the components illustrated in FIG. 11.

The AD conversion operation in the image sensor 2 is the same as the AD conversion operation in the image sensor 1 according to the first embodiment, which has been described with reference to FIGS. 3 and 4. The AD conversion operation in the image sensor 2 differs in an output timing at which the timing generator 701 outputs the clock signal Latch to the latch circuit 201 due to the above-described different configuration. However, the output timing of the clock signal Latch in the image sensor 2 is different only in that the clock signal Latch is output at a timing at which the pulse transit time period ends in the AD conversion operation of the AD converting circuit 101. Thus, a detailed description of the AD conversion operation in the image sensor 2 will not be included here.

Further, the latch circuit 201 included in the image sensor 2 has the same configuration as the latch circuit 201 included in the image sensor 1 according to the first embodiment. Further, control of the driving control signal, such as the clock signal Dout or the clock signal SW1, which is used to output the digital signal held in the latch circuit 201 to the encoder 999, can be considered to be the same as control of the latch circuit 201 in the image sensor 1 according to the first embodiment. Thus, a detailed description of the output timing of the driving control signal for controlling the latch circuit 201 and the transfer operation of the latch circuit 201 in the image sensor 2 according to the second embodiment of the present invention will not be made.

As described above, even in the image sensor 2 according to the second embodiment of the present invention, similarly to the image sensor 1 according to the first embodiment, the latch circuit 201 can be configured with the small circuit size, and a driving load required to transfer for the latch circuit 201 to transfer the digital signal can be reduced. Further, the latch circuit 201 can reliably transfer the digital signal output from the AD converting circuit 102. Further, similarly, the latch circuit 201 can be effectively arranged in a narrow area such as a column of the pixel array 102.

Further, the image sensor 2 according to the second embodiment of the present invention has been described in connection with the example in which the latch circuit 201 holds the digital signal including the transit position and the circling number of the pulse signal StartP, but the present invention is not limited to this configuration. For example, when the encoder 999 outputs the result of encoding the transit position of the pulse signal StartP as a digital signal of a lower bit, and outputs the circling number of the pulse signal StartP "as is" as a digital signal of an upper bit, the latch circuit 201 may be configured to output only the held transit position to the encoder 999 and to output the held circling number as the digital signal of the upper bit at a timing when the encoder 999 outputs the digital signal of the lower bit.

Third Embodiment

Figure 12:
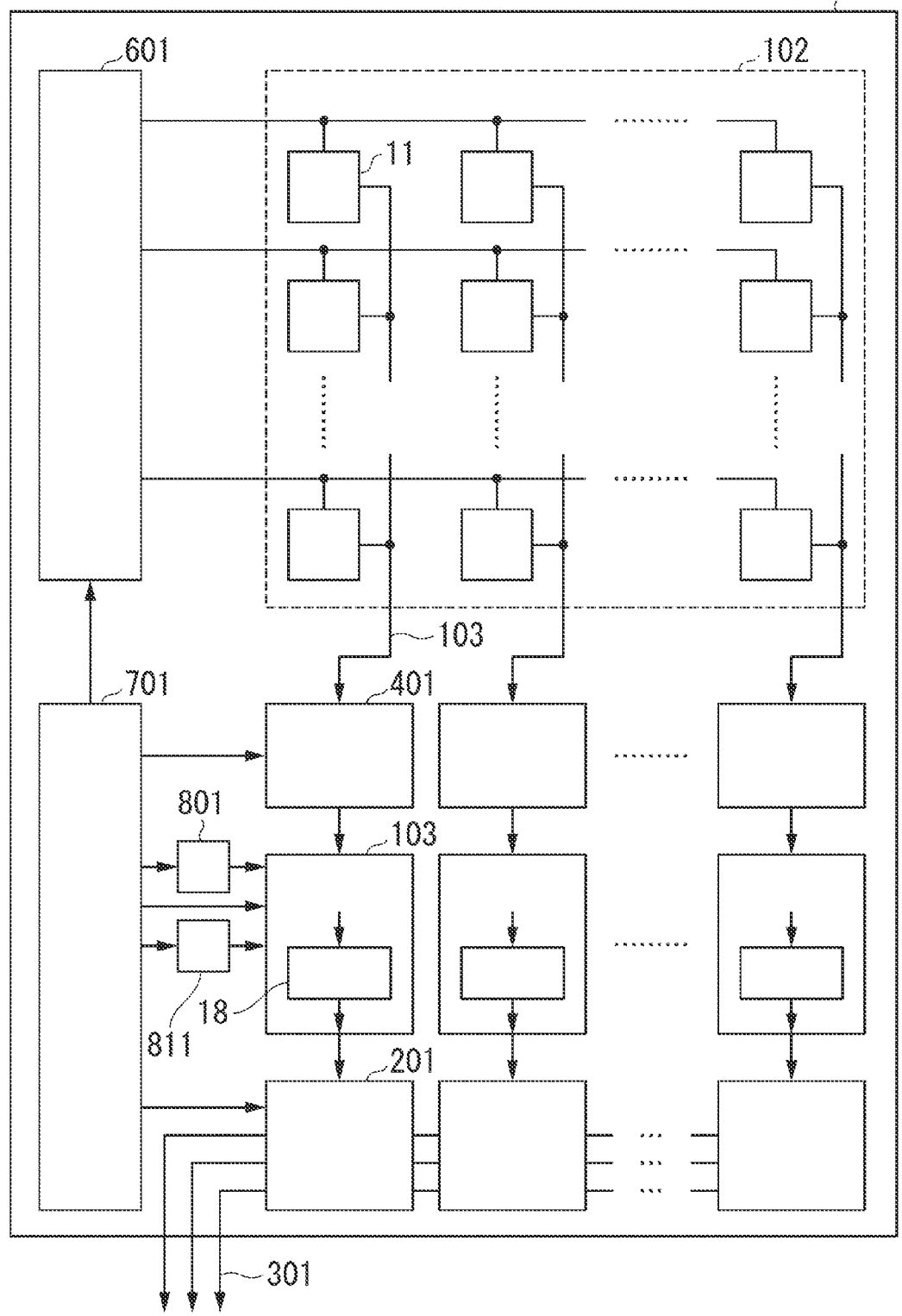
FIG. 12 is a block diagram illustrating a schematic configuration of an image sensor according to a third embodiment of the present invention.

Next, an image sensor according to a third embodiment of the present invention will be described. FIG. 12 is a block diagram illustrating a schematic configuration of an image sensor according to the third embodiment of the present invention. Referring to FIG. 12, an image sensor 3 includes a pixel array 102, a plurality of vertical signal lines 103, a plurality of CDS circuits 401, a plurality of AD converting circuits 102, a plurality of latch circuits 201, a plurality of horizontal signal lines 301, a vertical scanning circuit 601, a timing generator 701, a reference ramp signal generating circuit 801, and a reference clock signal generating circuit 811.

The image sensor 3 according to the third embodiment of the present invention is different from the image sensor 1 according to the first embodiment illustrated in FIG. 1 in that the AD converting circuit 102 is provided instead of the AD converting circuit 101, and the reference ramp signal generating circuit 801 and the reference clock signal generating circuit 811 are additionally provided. Due to this different configuration, the timing generator 701 further outputs driving control signals used to drive the reference ramp signal generating circuit 801 and the reference clock signal generating circuit 811. Further, in the image sensor 3 according to the third embodiment of the present invention, the latch circuit 201 receives the digital signal output from the AD converting circuit 102 instead of the AD converting circuit 101, and the remaining configuration is the same as the image sensor 1 of the first embodiment illustrated in FIG. 1. Thus, the same components as in the image sensor 1 according to the first embodiment illustrated in FIG. 1 are denoted by the same reference numerals, and a detailed description thereof will not be included here.

The reference ramp signal generating circuit 801 outputs a reference ramp signal RAMP which is compared with the pixel analog signal Vin to the AD converting circuit 102.

The reference clock signal generating circuit 811 outputs a reference clock signal CLK used to measure a time period between the start of the AD conversion operation and the end thereof to the AD converting circuit 102.

The AD converting circuit 102 is arranged to correspond to the CDS circuit 401 of each column. The AD converting circuit 102 outputs the n-bit digital signal, which has been AD-converted according to the voltage level of the pixel analog signal Vin input from the CDS circuit 401, to the latch circuit 201 based on the reference ramp signal RAMP input from the reference ramp signal generating circuit 801 and the reference clock signal CLK input from the reference clock signal generating circuit 811. The AD converting circuit 103 will be described in detail later.

Figure 13:
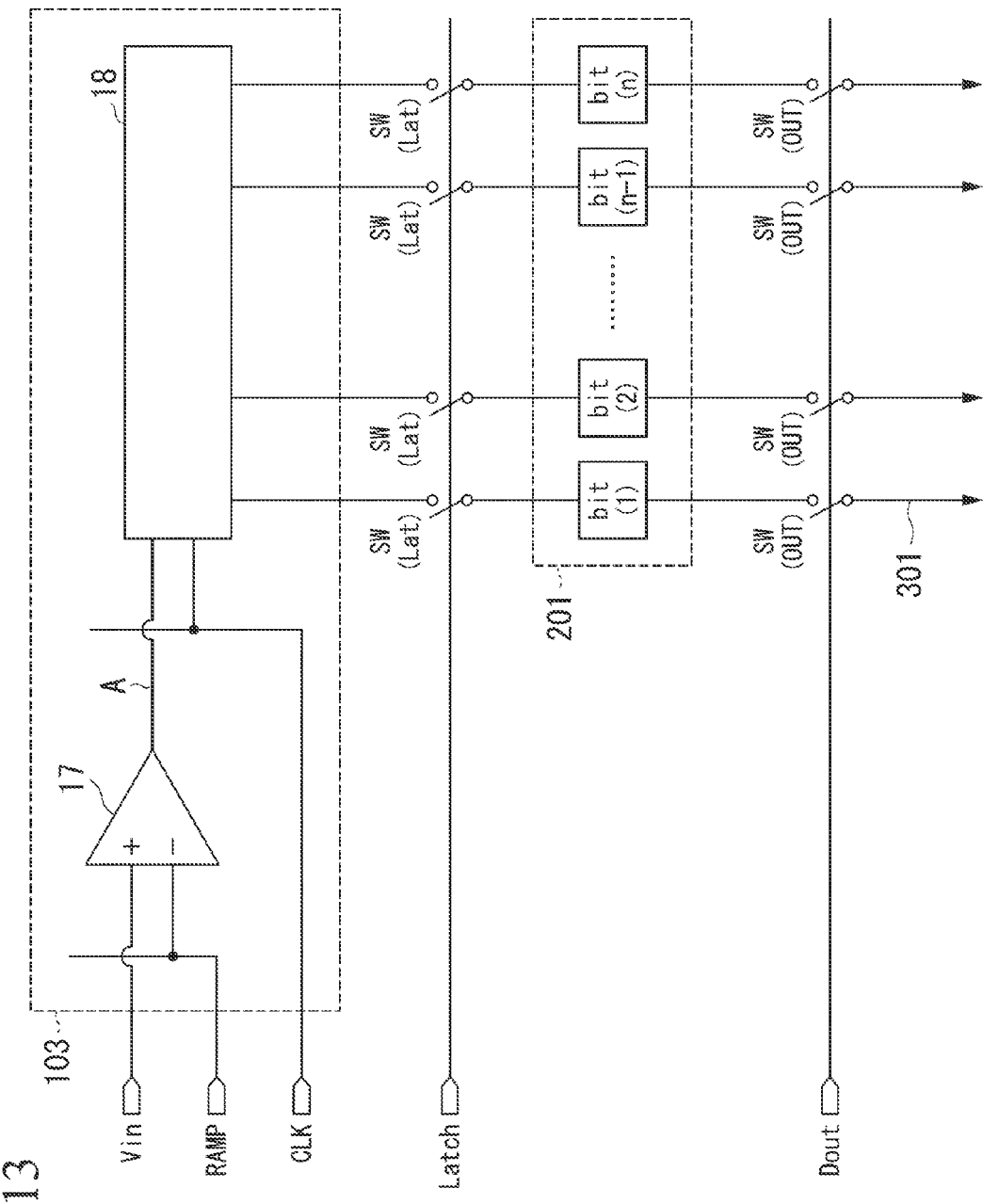
FIG. 13 is a circuit connection diagram illustrating a schematic connection example of components related to transfer of a digital signal in the image sensor according to the third embodiment.

Next, in order to describe the digital signal output operation by the image sensor 3, a more detailed configuration of the image sensor 3 according to the third embodiment of the present invention will be described with reference to FIG. 13. FIG. 13 is a circuit connection diagram illustrating a schematic connection example of components related to transfer of a digital signal in the image sensor 3 according to the third embodiment of the present invention. FIG. 13 illustrates a circuit configuration and a connection of the AD converting circuit 102 connected to one column (the first column) of the pixel array 102, the latch circuit 201, and the horizontal signal line 301 in the image sensor 3 illustrated in FIG. 12.

The AD converting circuit 103 includes a comparator 17 and a counter 18. In the comparator 17, the pixel analog signal Vin output from the CDS circuit 401 is input to one input terminal (+terminal) as a voltage of an AD conversion target, and the reference ramp signal RAMP output from the reference ramp signal generating circuit 801 is input to the other input terminal (−terminal).

The comparator 17 outputs an inversion signal A when the magnitude relation of the voltage input to the input terminal (+terminal) and the voltage input to the input terminal (−terminal) changes.

The counter 18 detects a timing at which the inversion signal A output from the comparator 17 changes based on the reference clock signal CLK input from the reference clock signal generating circuit 811. At the same time when the AD conversion operation starts, the counter 18 starts to count the number of clocks of the reference clock signal CLK, and then stops counting the number of clocks of the reference clock signal CLK at a timing when the inversion signal A of the comparator 17 changes.

The result of counting the number of clocks of the reference clock signal CLK through the counter 18 is the n-bit digital signal obtained by performing AD conversion on the pixel analog signal Vin through the AD converting circuit 102. That is, the AD converting circuit 102 has a configuration of outputting the counting result of the counter 18 as the digital signal with no encoder.

The configuration of the AD converting circuit 102 is not limited to this example. For example, the AD converting circuit 102 may have a configuration of outputting the result of encoding the counting result of the counter 18 through the encoder as the AD conversion result.

The latch circuit 201 has the same configuration as the latch circuit 201 described in the first embodiment.

The latch circuit 201 corresponds to each of output signals of digits (n bits) of the counter 18, and holds the output signals of the counter 18 in the AD converting circuit 102, that is, the respective bits of the n-bit digital signal in the latch units bit(1) to bit(n), at the input timing of the clock signal Latch output from the timing generator 701. Further, a number in "( ): parentheses" following a symbol of a latch unit bit illustrated in FIG. 13 represents a bit of a corresponding output signal of the counter 18.

The latch units bit in the latch circuit 201 corresponding to the AD converting circuit 102 of each column are connected with the latch units bit in the latch circuit 201 of a neighboring column, respectively, similarly to the latch circuit 201 described in the first embodiment. The latch circuit 201 of the first column illustrated in FIG. 13 outputs the held n-bit digital signal to the horizontal signal line 301 through the switch SW(OUT) in response to the clock signal Dout output from the timing generator 701.

In the image sensor 3 according to the third embodiment of the present invention, a configuration in which the AD converting circuit 102 is combined with the latch circuit 201 corresponds to the AD converting circuit 101 included in the image sensor 1 according to the first embodiment or the AD converting circuit 101 included in the image sensor 2 according to the second embodiment.

Figure 14:
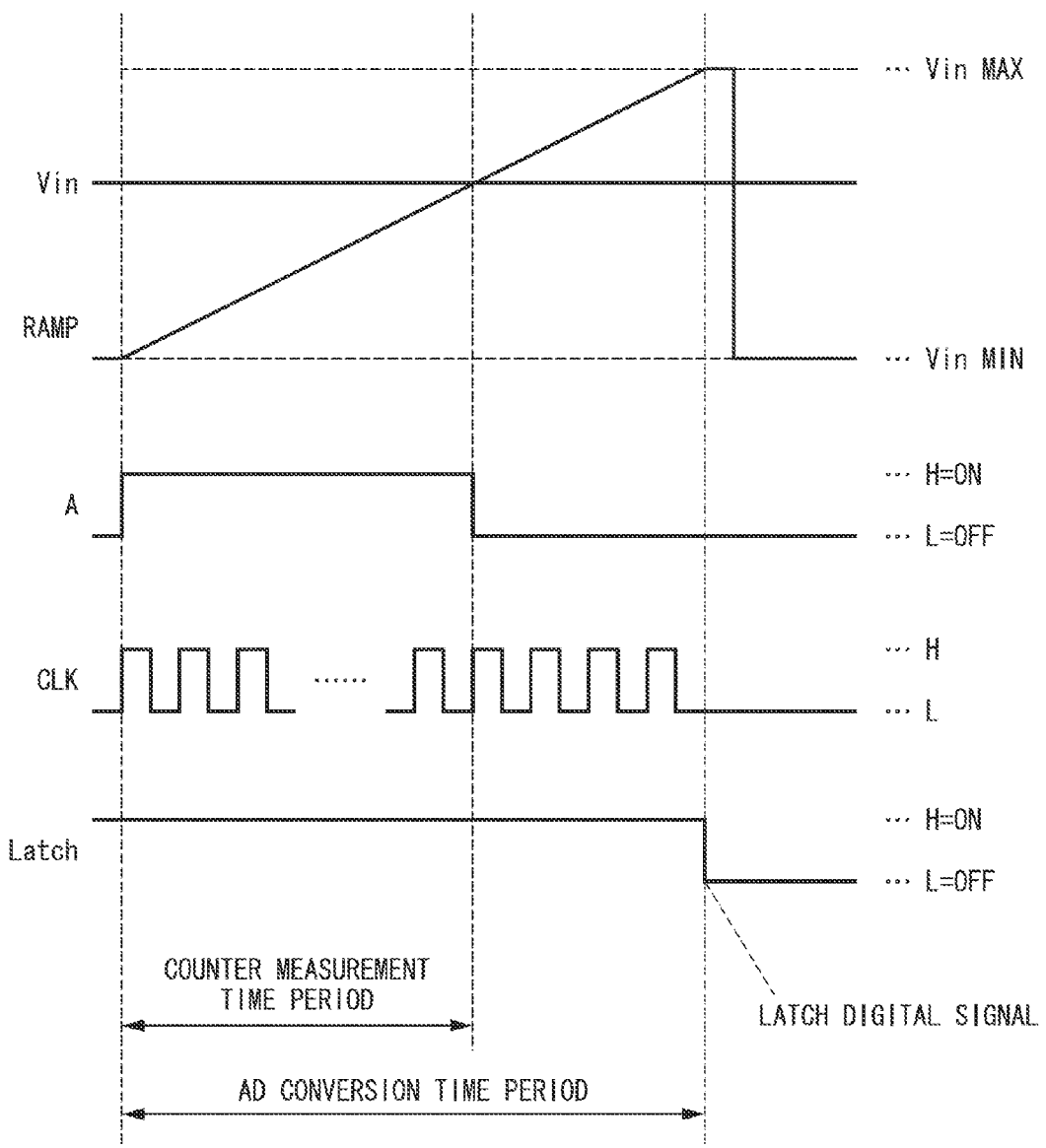
FIG. 14 is a timing chart illustrating an operation of an AD converting circuit included in the image sensor according to the third embodiment.
Figure 15:
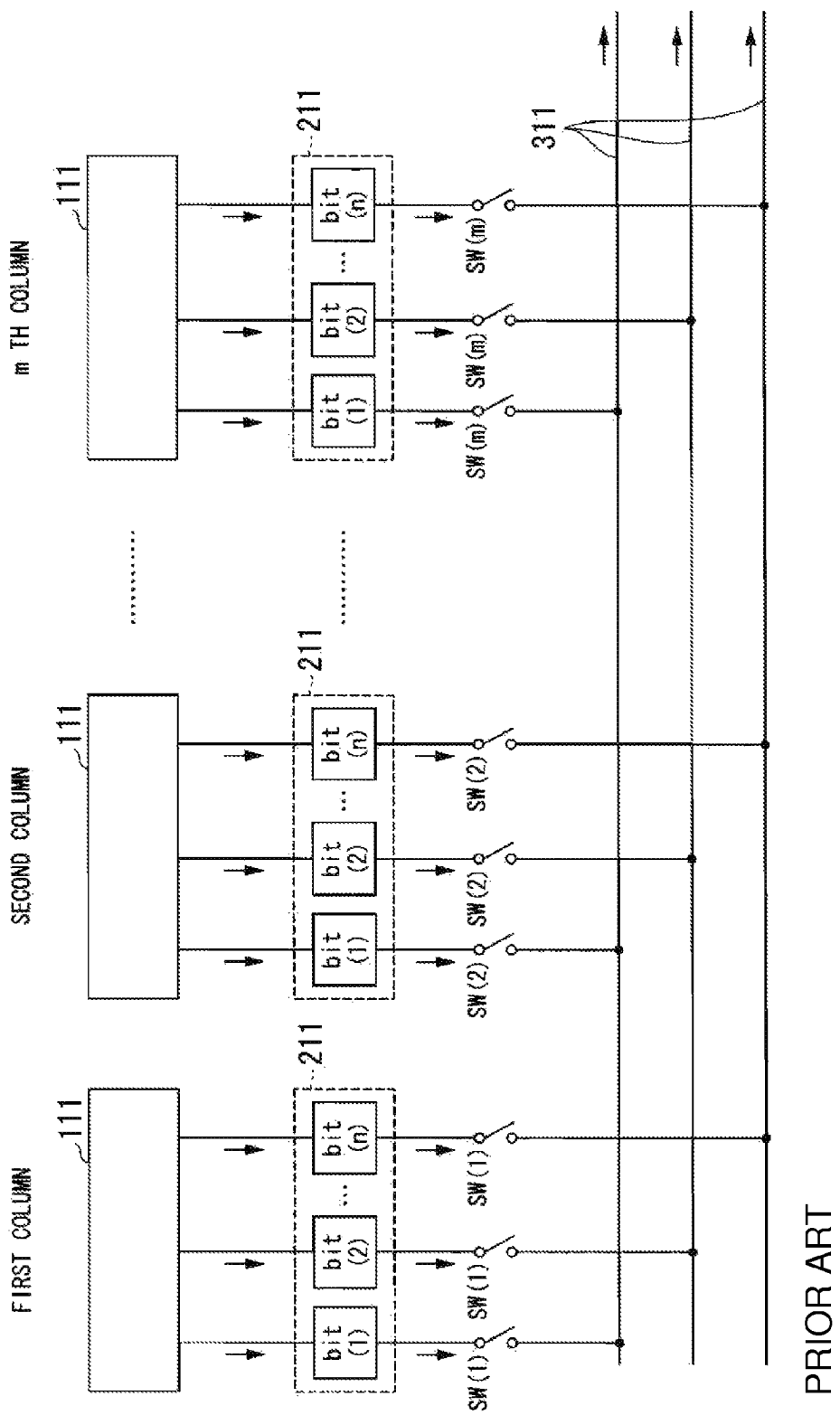
FIG. 15 is a circuit connection diagram illustrating an example of a connection of components related to transfer of a digital signal in an image sensor of a related art.
Figure 16:
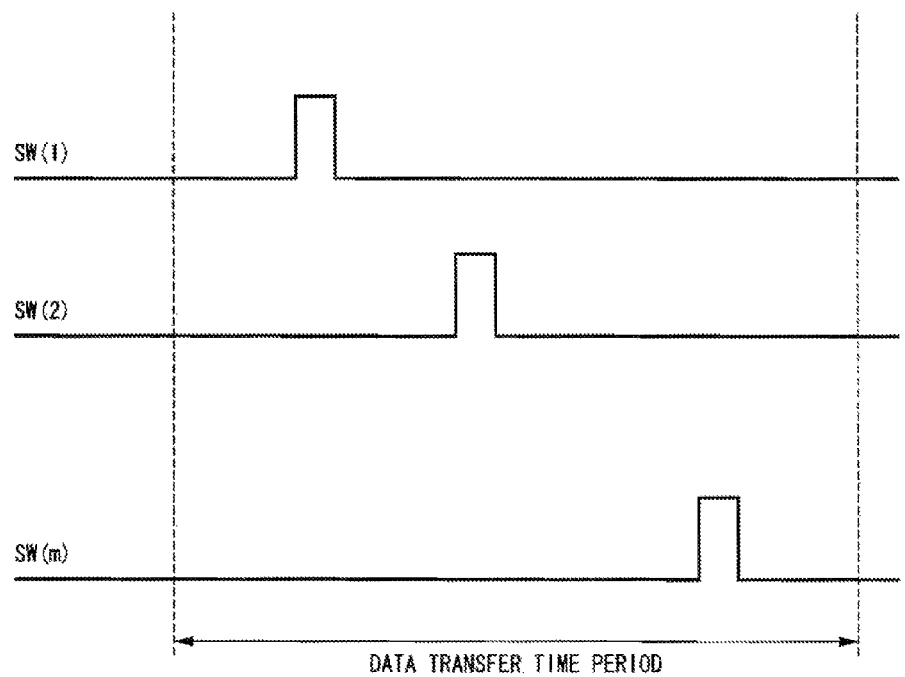
FIG. 16 is a timing chart illustrating a driving timing when a digital signal is output from a signal transfer circuit in the image sensor of the related art.

Next, the AD conversion operation of the AD converting circuit 102 will be described with reference to FIGS. 13 and 14. FIG. 14 is a timing chart illustrating an operation of the AD converting circuit 102 included in the image sensor 3 according to the third embodiment of the present invention.

First, the AD conversion operation starts in a state in which the pixel analog signal Vin of the AD conversion target is input from the CDS circuit 401 to the input terminal (+terminal) of the comparator 17, and at the same time, the reference ramp signal RAMP, which changes from a minimum voltage VinMIN of the pixel analog signal Vin to a maximum voltage VinMax thereof, is input from the reference ramp signal generating circuit 801 to the input terminal (−terminal) of the comparator 17. Further, at the same time, the reference clock signal CLK is input from the reference clock signal generating circuit 811 to the counter 18. Then, the counter 18 starts to count the reference clock signal CLK.

Thereafter, the voltage of the reference ramp signal RAMP increases, and then at a point in time at which a magnitude relation between the voltage of the reference ramp signal RAMP and the voltage of the pixel analog signal Vin is reversed, the inversion signal A which is being output from the comparator 17 is inverted. The counter 18 stops counting the number of clocks of the reference clock signal CLK at a timing at which the inversion signal A is inverted.

Thereafter, when the AD conversion time period ends, the clock signal Latch transitions to the "L" level, and the switch SW(Lat) is turned off. At the same time, the latch circuit 201 holds the respective bit signals of the n-bit digital signal output from the AD converting circuit 103 in the latch units bit(1) to bit(n), respectively.

Thereafter, the latch circuit 201 outputs the held n-bit digital signal to the outside through the horizontal signal line 301 as the output signal of the image sensor 3 in response to the clock signal Dout output from the timing generator 701.

Further, the latch circuit 201 included in the image sensor 3 has the same configuration as the latch circuit 201 included in the image sensor 1 according to the first embodiment or the latch circuit 201 included in the image sensor 2 according to the second embodiment. Further, control of the driving control signal, such as the clock signal Dout or the clock signal SW1, which is used to output the digital signal held in the latch circuit 201 to the horizontal signal line 301, can be considered to be the same as control of the latch circuit 201 in the image sensor 1 according to the first embodiment. Thus, a detailed description of the output timing of the driving control signal for controlling the latch circuit 201 and the transfer operation of the latch circuit 201 in the image sensor 3 according to the third embodiment of the present invention will not be included here.

As described above, even in the image sensor 3 according to the third embodiment of the present invention, similarly to the image sensor 1 according to the first embodiment and the image sensor 2 according to the second embodiment, the latch circuit 201 can be configured with the small circuit size, and a driving load required for the latch circuit 201 to transfer the digital signal can be reduced. Further, the latch circuit 201 can reliably transfer the digital signal output from the AD converting circuit 103. Further, similarly, the latch circuit 201 can be effectively arranged in a narrow area such as a column of the pixel array 102.

As described above, according to the embodiments of the present invention, the latch circuit and transfer control by which the digital signal output from the AD converting circuit can be reliably transferred without deteriorating the digital signal can be implemented. Further, according to the embodiments of the present invention, the circuit size of the latch circuit and the memory circuit can be reduced, and thus the signal transfer can be reliably performed at a high speed. Accordingly, the latch circuit can be arranged even in a narrow area.

The present embodiment has been described in connection with the example in which the latch circuit is applied to the image sensor in which the AD converting circuit is arranged for each column of the pixel array. However, an area in which the latch circuit is arranged is not limited to the embodiment for embodying the present invention, and, for example, the latch circuit can be applied to a case other than the image sensor. Particularly, when an area to apply is narrow, the effects of the latch circuit configured with the first latch unit bit or the second latch unit bit are effective.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An imaging device, comprising:
a pixel unit including a plurality of pixels, each of which outputs a pixel signal corresponding to a quantity of incident light, the pixels being arranged in a two-dimensional matrix form;
m digital signal output circuits (m is a natural number larger than 1), each of which is arranged for a column of the pixel unit or for every two or more columns, receives the pixel signal output from the pixel of the corresponding column, and outputs an n-bit digital signal (n is a natural number equal to or more than 1) corresponding to a level of the input pixel signal;
m latch circuits, each of which is arranged to correspond to the digital signal output circuit, and includes n latch unit, the latch units receiving bit signals of the n-bit digital signal output from the corresponding digital signal output circuit at input terminals of the latch units, holding the bit signals of the n-bit digital signal, and outputting the bit signals of the n-bit digital signal to output terminals of the latch units;
n horizontal signal lines through which the bit signals of the n-bit signal held in the n latch units are output; and
n×(m−1) switches, each of which is arranged between the every two neighboring latch units among the n×m latch units that hold the bit signals being output through the n horizontal signal lines, each of the every two neighboring latch units holding the bit signals corresponding to the pixel signals output from the pixels that are arranged in a same line of the pixel unit,
wherein
each of the n×(m−1) switches is capable of switching the bit signal that is input at the input terminal of a first neighboring latch unit, from a first bit signal that is output from the digital signal output circuit corresponding to the latch circuit including the first neighboring latch unit, to a second bit signal that is output from the output terminal of a second neighboring latch unit, and then transferring the second bit signal that is output from the output terminal of the second neighboring latch unit,
n×(m−2) latch units are arranged as that the input terminal and the output terminal of each of the n×(m−2) latch units are connected with the output terminal and the input terminal of the other latch units via each of the n×(m−1) switches, among the n×m latch units included in the m latch circuits,
both of the bit signals being output from the corresponding digital signal output circuits and the bit signals corresponding to the pixel signals output from the pixels that are arranged in the same line of the pixel unit are capable of being held by the n×(m−2) latch units, and
each of the n×(m−2) latch units is capable of inputting the bit signals being held by the latch units that are arranged at a side of the input terminals of each of the n×(m−2) latch units, at the input terminals subsequently, and outputting the bit signals to the latch units that are arranged at a side of the output terminals of each of the n×(m−2) latch units subsequently.

2. The imaging device according to claim 1,
wherein the digital signal output circuit includes a plurality of delay units that delay an input pulse signal by a predetermined time to propagate the input pulse signal, and
the digital signal output circuit outputs a signal, which is based on the number of the delay units to which the pulse signal has propagated during a predetermined sampling time period with a delay time corresponding to the level of the input pixel signal, as the digital signal.

3. The imaging device according to claim 2,
wherein the digital signal output circuit further includes a delay circuit configured such that the plurality of delay units are connected in a ring form, and a counter circuit that counts a circling number of times that the pulse signal circles around the delay units, and
the digital signal output circuit outputs an output of each of the delay units configuring the delay circuit and the circling number counted by the counter circuit as the digital signal.

4. The imaging device according to claim 3,
wherein the digital signal output circuit further includes a digital signal generating circuit that generates the digital signal based on the output of each of the delay units configuring the delay circuit and the circling number counted by the counter circuit.

5. The imaging device according to claim 1,
wherein the digital signal output circuit includes a comparison circuit that compares a magnitude relation of a voltage of the input pixel signal and a voltage of a reference ramp signal that changes from a minimum voltage of the pixel signal to a maximum voltage, and outputs a signal representing the magnitude relation, and a counter circuit that counts the number of reference clock signals until the signal representing the magnitude relation is inverted after the reference ramp signal is input, and
the digital signal output circuit outputs the number of reference clock signals counted by the counter circuit as the digital signal.

6. The imaging device according to claim 3,
wherein the digital signal output circuit is an analog-digital (AD) converting circuit that converts the input pixel signal into the digital signal, and outputs the digital signal.

7. The imaging device according to claim 1,
wherein each of the latch units included in the latch circuit holds a corresponding bit of the digital signal by a single feedback loop.

8. The imaging device according to claim 4,
wherein the digital signal output circuit is an analog-digital (AD) converting circuit that converts the input pixel signal into the digital signal, and outputs the digital signal.

9. The imaging device according to claim 5,
wherein the digital signal output circuit is an analog-digital (AD) converting circuit that converts the input pixel signal into the digital signal, and outputs the digital signal.

* * * * *